US010636226B2

(12) United States Patent
An et al.

(10) Patent No.: US 10,636,226 B2
(45) Date of Patent: Apr. 28, 2020

(54) VEHICLE, TERMINAL COMMUNICATING WITH THE VEHICLE, AND METHOD OF CONTROLLING THE VEHICLE

(71) Applicants: HYUNDAI MOTOR COMPANY, Seoul (KR); KIA MOTORS CORPORATION, Seoul (KR)

(72) Inventors: Daeyun An, Anyang-si (KR); Seunghyun Woo, Seoul (KR); Seok-young Youn, Seoul (KR); Gi Beom Hong, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 267 days.

(21) Appl. No.: 15/801,147

(22) Filed: Nov. 1, 2017

(65) Prior Publication Data
US 2018/0348012 A1 Dec. 6, 2018

(30) Foreign Application Priority Data
Jun. 2, 2017 (KR) .................. 10-2017-0068875

(51) Int. Cl.
*G07C 5/08* (2006.01)
*G01C 21/34* (2006.01)
*G01C 21/36* (2006.01)
*B60R 16/023* (2006.01)

(52) U.S. Cl.
CPC ............ *G07C 5/08* (2013.01); *B60R 16/0236* (2013.01); *G01C 21/3469* (2013.01); *G01C 21/3697* (2013.01)

(58) Field of Classification Search
CPC .................. G01C 21/3697; G01C 21/3469
See application file for complete search history.

(56) References Cited

U.S. PATENT DOCUMENTS

| | | | |
|---|---|---|---|
| 7,711,592 B2 | 5/2010 | Kawabe et al. | |
| 8,239,127 B2 | 8/2012 | Kono et al. | |
| 9,151,630 B2 | 10/2015 | Miura et al. | |
| 9,423,269 B2* | 8/2016 | Miljkovic | G01C 21/3697 |
| 2009/0070027 A1* | 3/2009 | Newhouse | G01L 3/26 701/123 |
| 2010/0235076 A1* | 9/2010 | Ofek | G01C 21/3469 701/123 |
| 2013/0158849 A1 | 6/2013 | Maura | |
| 2016/0216130 A1* | 7/2016 | Abramson | G01C 21/3626 |

FOREIGN PATENT DOCUMENTS

| | | |
|---|---|---|
| JP | 2011-117838 A | 6/2011 |
| JP | 2012-117961 A | 6/2012 |
| JP | 2013-86613 A | 5/2013 |
| JP | 2016-38769 A | 3/2016 |
| KR | 10-1298835 B1 | 8/2013 |

* cited by examiner

*Primary Examiner* — Todd M Melton
(74) *Attorney, Agent, or Firm* — McDonnell Boehnen Hulbert & Berghoff LLP

(57) ABSTRACT

Disclosed herein are a vehicle including a stop state detector configured to detect a stop state; a load state detector configured to detect a load state; a controller configured to determine, if the vehicle changes to the stop state, whether a load state has changed, and to acquire fuel efficiency information based on a driving distance, if determining that the load state has changed; and a display configured to display the fuel efficiency information.

20 Claims, 15 Drawing Sheets

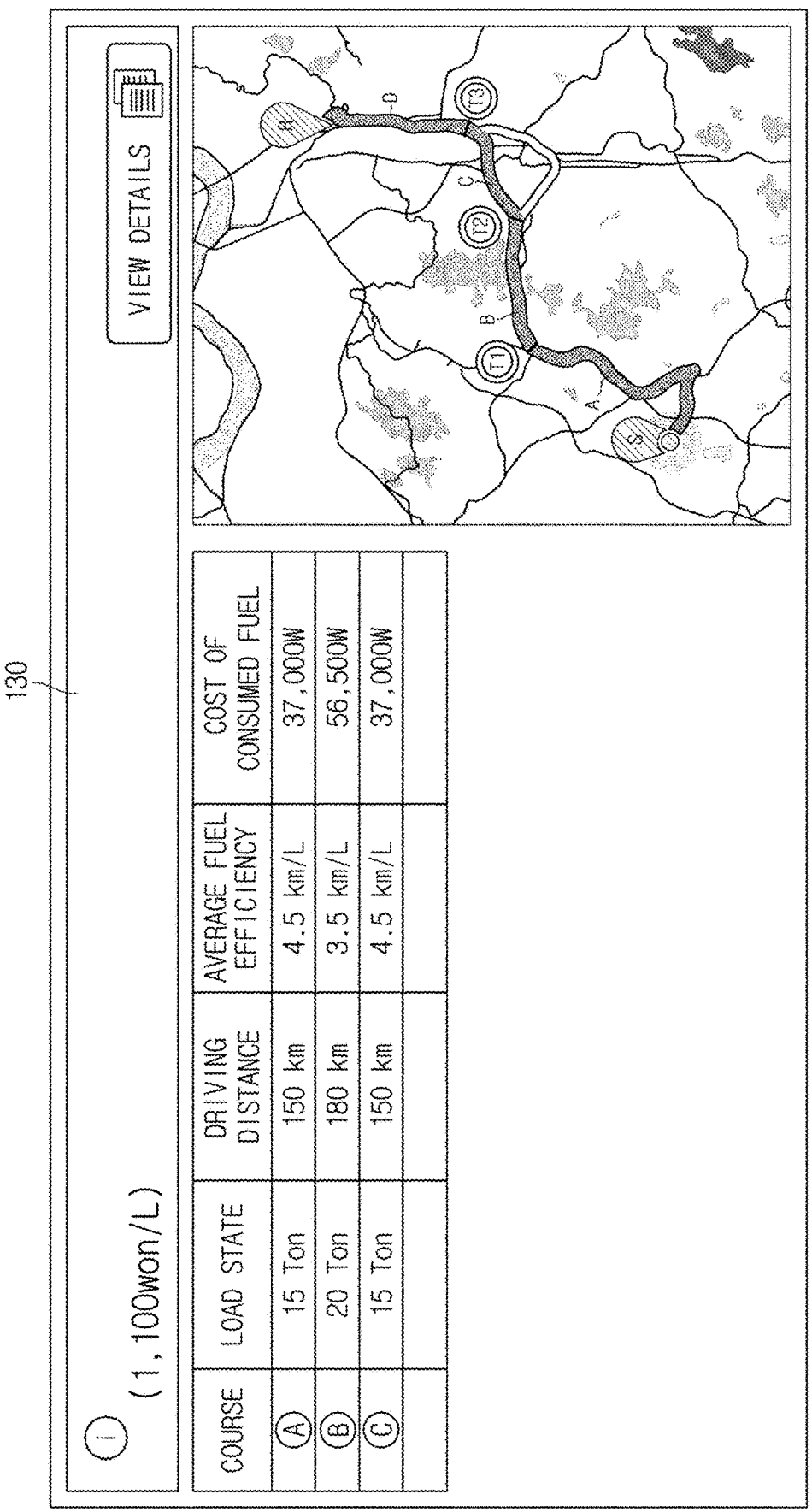

VEHICLE, TERMINAL COMMUNICATING WITH THE VEHICLE, AND METHOD OF CONTROLLING THE VEHICLE

CROSS-REFERENCE TO RELATED APPLICATION

This application claims the benefit of Korean Patent Application No. 10-2017-0068875, filed on Jun. 2, 2017 in the Korean Intellectual Property Office, the disclosure of which is incorporated herein by reference.

BACKGROUND

1. Field

Embodiments of the present disclosure relate to a vehicle of displaying fuel efficiency information, a terminal of communicating with the vehicle, and a method of controlling the vehicle.

2. Description of the Related Art

A vehicle is a machine that travels on a road by driving wheels for the purpose of transporting humans or goods.

Vehicles are classified into a passenger vehicle for personal use and for the purpose of transport, and a commercial vehicle for commercial use and for the purpose of transporting goods or humans.

Examples of the commercial vehicle are a truck, a dump truck, a van, a forklift truck, a special-purpose vehicle, a bus, and a taxi.

A trailer having no power source and drawn by a vehicle to travel on a road is connected to the rear portion of the vehicle.

The trailer is designed to transport humans or goods or to be detachably connected to the vehicle.

Examples of a trailer that can be connected to a passenger vehicle are a caravan and a mini cargo trailer, and examples of a trailer that can be connected to a truck are a full trailer, a tolly, a bus full trailer, and a semi trailer.

A vehicle has different fuel efficiency according to the number of passengers or an amount of goods loaded in a trailer.

The disclosure of this section is to provide background of the invention. Applicant notes that this section may contain information available before this application. However, by providing this section, Applicant does not admit that any information contained in this section constitutes prior art.

SUMMARY

Therefore, it is an aspect of the present disclosure to provide a vehicle of acquiring fuel efficiency information based on stop information and weight information, and displaying the fuel efficiency information, a terminal of communicating with the vehicle, and a method of controlling the vehicle.

It is another aspect of the present disclosure to provide a vehicle of dividing a driving path into a plurality of courses based on a change in weight and acquiring fuel efficiency information for each course to display the fuel efficiency information, a terminal of communicating with the vehicle, and a method of controlling the vehicle.

It is still another aspect of the present disclosure to provide a vehicle of displaying fuel efficiency information for each course of a plurality of paths from a point of departure to a destination, a terminal of communicating with the vehicle, and a method of controlling the vehicle.

Additional aspects of the disclosure will be set forth in part in the description which follows and, in part, will be obvious from the description, or may be learned by practice of the disclosure.

In accordance with one aspect of the present disclosure, a vehicle includes: a stop state detector configured to detect a stop state; a load state detector configured to detect a load state; a controller configured to determine, if the vehicle changes to the stop state, whether a load state has changed, and to acquire fuel efficiency information based on a driving distance, if determining that the load state has changed; and a display configured to display the fuel efficiency information.

The stop state detector includes a speed detector configured to detect driving speed, and if the driving speed is zero, the controller determines that the vehicle is in the stop state.

The load state detector includes a weight detector configured to detect weight of at least one of goods and a passenger.

The vehicle may further include an input device configured to receive information of a destination; and a storage device configured to store at least one path, and fuel efficiency information for each course of the at least one path. If the information of the destination is received, the controller searches a path from a current location to the destination, and if the found path is identical to the at least one path stored in the storage device, the controller controls the display to display fuel efficiency information for each course of the found path.

The display includes at least one of a cluster and a terminal for vehicle.

The controller acquires a driving distance for a time period between time at which the vehicle starts and time at which the vehicle stops, based on navigation information received from the terminal for vehicle.

The vehicle may further include an odometer configured to record a driving distance while the vehicle travels. The controller receives a total driving distance from the odometer at time at which the vehicle starts, receives a total driving distance from the odometer at time at which the vehicle stops, and subtracts the total driving distance received at the time at which the vehicle starts from the total driving distance received at the time at which the vehicle stops to acquire a driving distance for a time period between the time at which the vehicle starts and the time at which the vehicle stops.

The vehicle may further include a first pressing detector configured to detect pressure applied to an accelerator pedal; and a second pressing detector configured to detect pressure applied to a brake pedal The controller acquires acceleration information based on the pressure detected by the first pressing detector, acquires braking information based on the pressure detected by the second pressing detector, acquires information for improving a user's driving habits for reducing fuel efficiency, based on the acquired acceleration information and the acquired braking information, and controls the display to display the information for improving the user's driving habits.

The vehicle may further include a communication device configured to receive refueling information from an external server. The controller acquires cost of consumed fuel based on the received refueling information, and controls the display to display the cost of consumed fuel.

In accordance with another aspect of the present disclosure, a terminal includes a communication interface configured to receive load information, and to receive location information periodically; a processor configured to acquire driving speed and a driving distance of a vehicle based on the location information, to determine a stop state of the vehicle based on the driving speed, to determine whether load information has changed if the vehicle changes from a driving state to the stop state, and to acquire fuel efficiency information for a course between a departure location and a stop location based on the driving distance if determining that the load information has changed; and a display configured to display the fuel efficiency information.

The terminal may further include an input device configured to receive the load information.

The terminal may further include an input device configured to receive a navigation mode and information of the destination. If the navigation mode and the information of the destination are received, the processor searches a path from a current location to the destination, and if the found path is identical to at least one pre-stored path, the processor controls the display to display fuel efficiency information for each course of the found path.

The communication interface receives braking information and acceleration information from the vehicle. The processor acquires information for improving a user's driving habits for reducing fuel efficiency, based on the acceleration information and the braking information, and controls the display to display the information for improving the user's driving habits.

The communication interface receives refueling information from an external server. The processor acquires cost of consumed fuel for the course based on the refueling information, and controls the display to display the cost of consumed fuel.

In accordance with another aspect of the present disclosure, a method of controlling a vehicle, includes: determining whether the vehicle stops; if it is determined that the vehicle stops, determining whether weight of goods loaded in the vehicle has changed; if it is determined that the weight of goods has changed, setting a path between a departure location and a current location to a course; acquiring fuel efficiency information for the course based on a driving distance between the departure location and the current location; and displaying the fuel efficiency information.

The determining of whether the vehicle stops comprises: detecting driving speed of the vehicle; and if the driving speed of the vehicle is zero, determining that the vehicle stops.

The method may further include: storing a location of the vehicle at time at which the driving speed is not zero, as the departure location; and detecting a current location of the vehicle when the driving speed becomes zero while the vehicle travels.

The method may further include: acquiring a total driving distance from an odometer when the driving speed is not zero; acquiring a total driving distance from the odometer when the vehicle stops; and subtracting the total driving distance of when the driving speed is not zero from the total driving distance of when the vehicle stops, thereby acquiring the driving distance.

The method may further include: detecting a current location if a navigation mode is selected and information of a destination is received; searching a path from the current location to the destination; and controlling a display to display fuel efficiency information for each course of the found path, if the found path is identical to at least one pre-stored path.

The method may further include: acquiring the driving distance based on a path along which the vehicle has moved in the found path when the navigation mode is performed.

The method may further include: acquiring acceleration information based on pressure detected by a first pressing detector; acquiring braking information based on pressure detected by a second pressing detector; acquiring information for improving a user's driving habits for reducing fuel efficiency, based on the acceleration information and the braking information; and displaying the information for improving the user's driving habits.

The method may further include: receiving refueling information from an external server; and acquiring cost of consumed fuel based on the refueling information, and displaying the cost of consumed fuel.

BRIEF DESCRIPTION OF THE DRAWINGS

These and/or other aspects of the disclosure will become apparent and more readily appreciated from the following description of embodiments, taken in conjunction with the accompanying drawings of which:

FIGS. 7, 8A-8E and 9-11 show examples of display of fuel economy information for each section of the vehicle according to an embodiment of the present disclosure.

DETAILED DESCRIPTION

Figure 1:
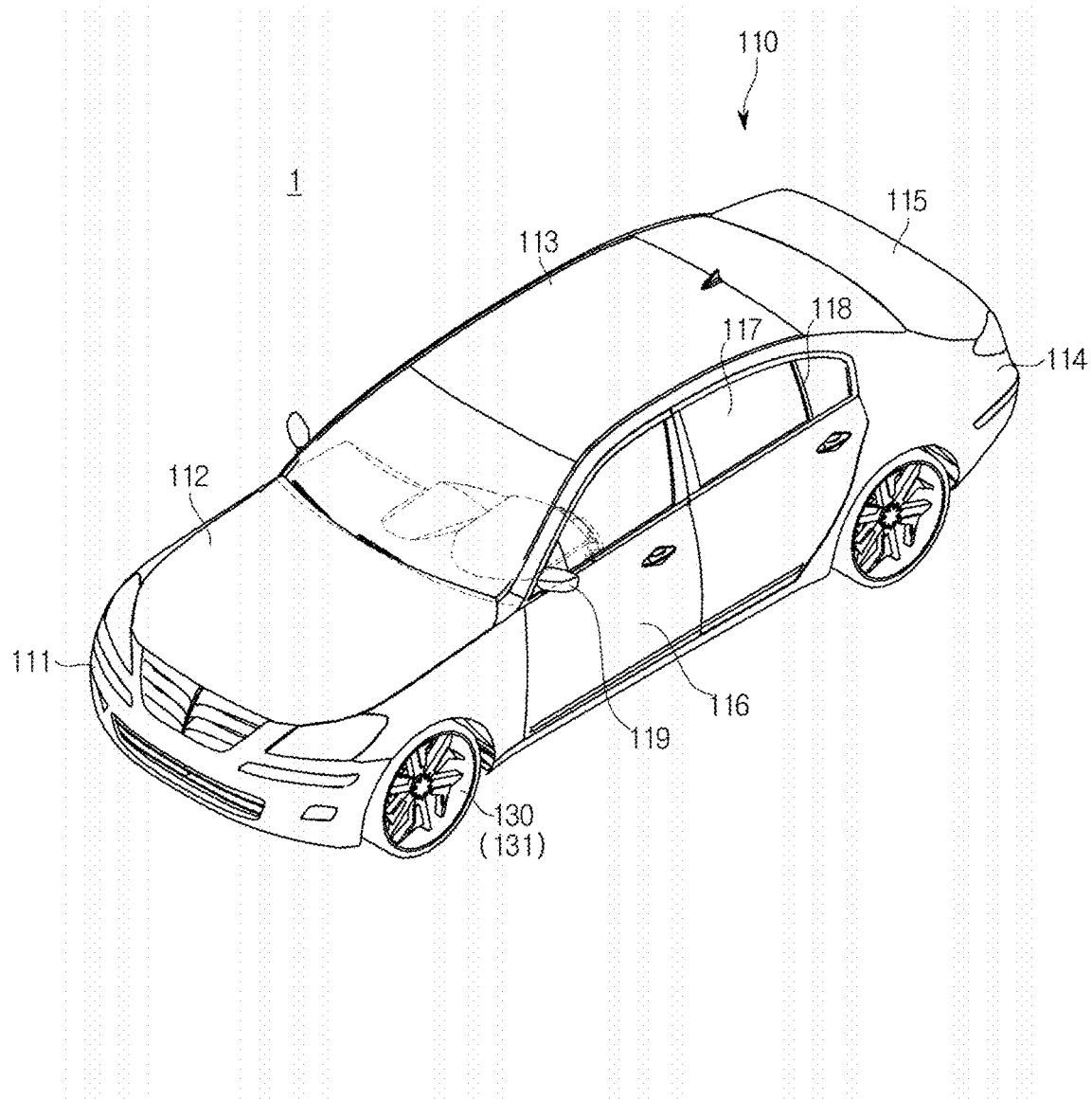
FIG. 1 shows an example of an external appearance of a passenger vehicle according to an embodiment of the present disclosure.

Like reference numerals refer to like elements throughout this specification. This specification may not describe all components of embodiments, and general information in the technical field to which the present disclosure belongs or overlapping information between embodiments will not be described. The terms "portion", "module", "member", and "block", as used herein, may be implemented as software or hardware, and according to embodiments, a plurality of "portions", "modules", "members", or "blocks" may be implemented as a single component, or a single "portion", "module", "member", or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

Also, it will be understood that when the terms "includes," "comprises," "including," and/or "comprising," when used in this specification, specify the presence of a stated component, but do not preclude the presence or addition of one or more other components.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, the present disclosure will be described in detail with reference to the accompanying drawings.

According to an aspect of the present invention, a computing system for monitoring feel efficiency of a vehicle is disclosed. While a vehicle is driving, a computing system of the vehicle monitors and records a weight of the vehicle, a fuel level of the vehicle, and status (speed, acceleration) of the vehicle. The computing system records the weight every time the vehicle stops for a time period longer than a reference time or the vehicle turns off.

In embodiments, when the weight of vehicle increases by an amount greater than a reference weight (from the last record) and the vehicle starts moving with the increased weight, the computing system identifies a cargo loading event and a starting of a (cargo delivery) trip. The computing system record in a data store location of trip starting point, a fuel level at the trip starting point. Subsequently, when the vehicle stops and the weight of the vehicle decreases by an amount greater than a reference weight within a reference time since the stopping, the computing system identifies a stop and a cargo unloading event. The computing system, records a location of the stop and a fuel level at the stop. In embodiment, the computing system computes a field efficiency for a trip segment from the trip starting point (or the last stop) to the current stop using at least one of travel distance of the trip segment, fuel level decrease during the trip segment, driving speed, acceleration/deceleration during the trip segment. In embodiment, the computing system defines a trip segment between two immediately sequential cargo loading/unloading events (vehicle weight change greater than a reference weight).

Figure 2:
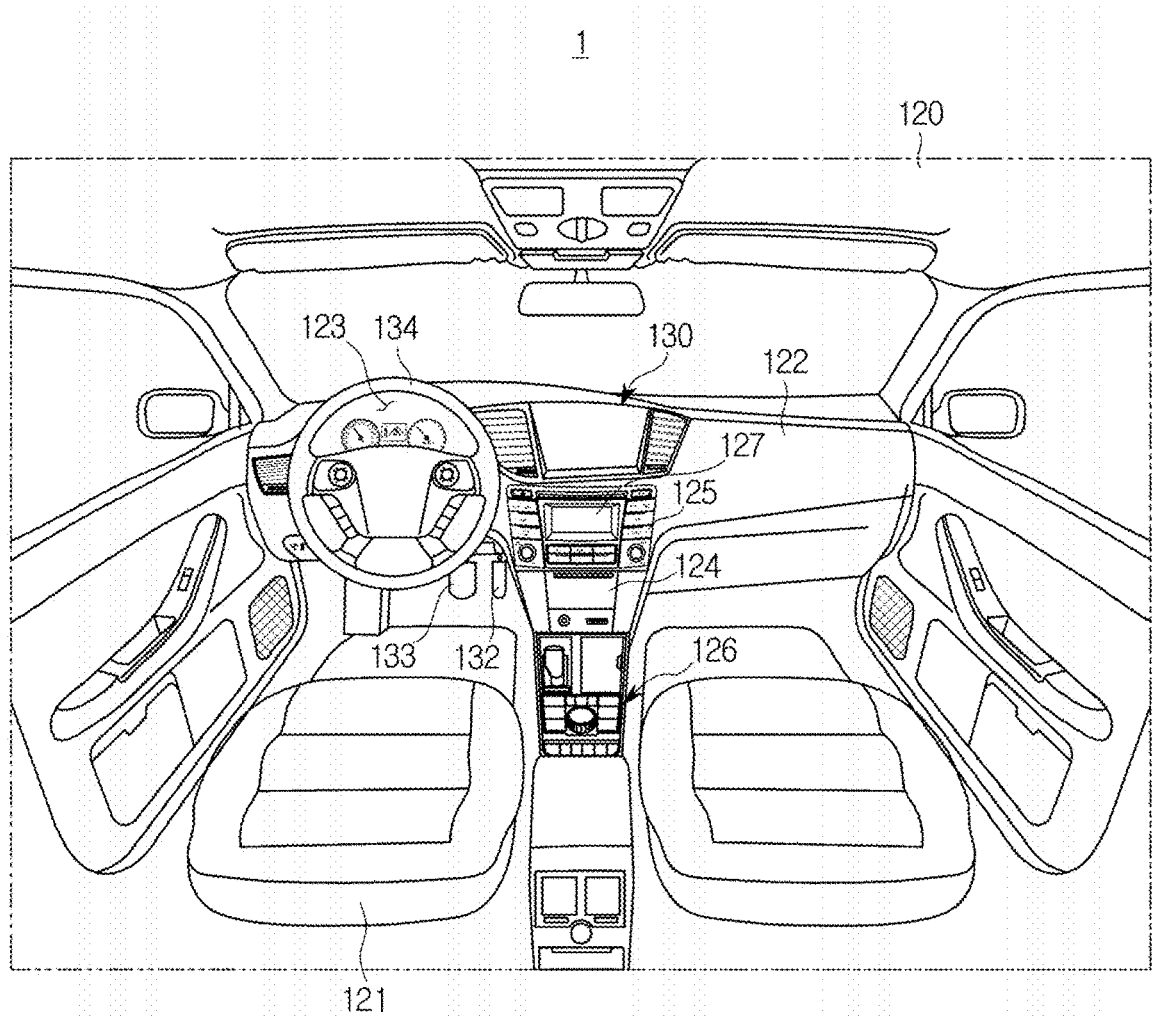
FIG. 2 shows an example of an interior of the passenger vehicle shown in FIG. 1.

In embodiments, when the vehicle arrives a destination and turns off after making at least one cargo unloading/loading stop, feel efficiency for each trip segment (between stops) from the trip starting to the destination is provided to the vehicle's driver or a remote computing system. FIG. 1 shows an example of an external appearance of a passenger vehicle according to an embodiment of the present disclosure, and FIG. 2 shows an example of an interior of the passenger vehicle shown in FIG. 1.

A passenger vehicle 1 may include a body having an exterior 110 and an interior 120, and a chassis which is the remaining portion except for the body and in which mechanical equipment required for driving is installed.

As shown in FIG. 1, the exterior 110 of the body may include a front panel 111, a hood 112, a loop panel 113, a rear panel 114, a trunk 115, front, rear, left, and right doors 116, and window glass 117 installed in the front, rear, left, and right doors 116, wherein the window glass 117 can open.

The exterior 110 of the body may further include a plurality of fillers 118 installed in borders between the front panel 111, the hood 112, the loop panel 113, the rear panel 114, the trunk 115, and the window glass 117 of the front, rear, left, and right doors 116, and a plurality of side-view mirrors 119 to provide a driver with a rear view of the passenger vehicle 1.

As shown in FIG. 2, the interior 120 of the body may include a seat 121 on which a passenger sits, a dashboard 122, an instrument panel (that is, a cluster 123) which is disposed on the dashboard 122 and on which a tachometer, a speedometer, a coolant thermometer, a fuel gauge, a turn signal indicator light, a high beam indicator light, a warning light, a seat belt warning light, an odometer, a traveling recorder, an automatic transmission lever indicator light, a door open warning light, an engine oil warning light, a fuel warning light, etc. are mounted, and a center fascia 124 on which a vent and a control panel of an air conditioner are mounted and on which audio system is installed.

In the center fascia 124, a head unit 125 may be disposed to control the audio system, the air conditioner, and a heater.

The interior 120 of the body may include a display 127 and an input device 126 for interfacing with a user, and further include a terminal 130 for vehicle.

The input device 126 may receive commands for executing various functions.

The input device 126 may be disposed in the head unit 125 and the center fascia 124.

The input device 126 may include at least one physical button, such as buttons for turning on/off various functions and buttons for changing setting values of the various functions.

The input device 126 may further include a touch pad or a jog dial for enabling the user to input a command for moving a cursor displayed on the terminal 130 and a selection command.

The display 127 may be disposed on at least one of the cluster 123 and the head unit 125, and display information about a function being performed in the passenger vehicle 1 and information input by the user.

The terminal 130 may include a display panel, or a touch screen configured by integrating a touch panel into a display panel.

The terminal 130 may perform an audio mode, a video mode, a navigation mode, a Digital Multimedia Broadcasting (DMB) mode, and a radio mode, and when performing the navigation mode, the terminal 130 may display map information, path information, and road guide information.

If the terminal 130 includes only the display panel, the terminal 130 may receive a user input of selecting a button displayed on the terminal 130 through the input device 126.

Also, the terminal 130 may display information about a function being performed, and information input by the user, and may receive or display information about a blind spot.

A trailer may be detachably connected to the body of the passenger vehicle 1.

The chassis of the passenger vehicle 1, which is a frame for supporting the body 110 and 120, may include a plurality of wheels 131 disposed in the front, rear, left and right portions, a power apparatus to apply a driving force to the wheels 131 disposed in the front, rear, left and right portions, a steering apparatus, a brake apparatus to apply a braking force to the wheels 131, and a suspension apparatus.

The passenger vehicle 1 may include an accelerator pedal 132 that is pressed by the user according to the user's acceleration intention, a brake pedal 133 that is pressed by the user according to the user's braking intention, and a steering wheel 134 of the steering apparatus for enabling the user to change a driving direction.

In the passenger vehicle 1, fuel efficiency may change according to information about pressure applied to the accelerator pedal 132 and the brake pedal 133, according to the number of passengers or total weight of passengers, according to whether a trailer is connected to the passenger vehicle 1, and according to weight of goods loaded in the trunk or the trailer.

Figure 3:
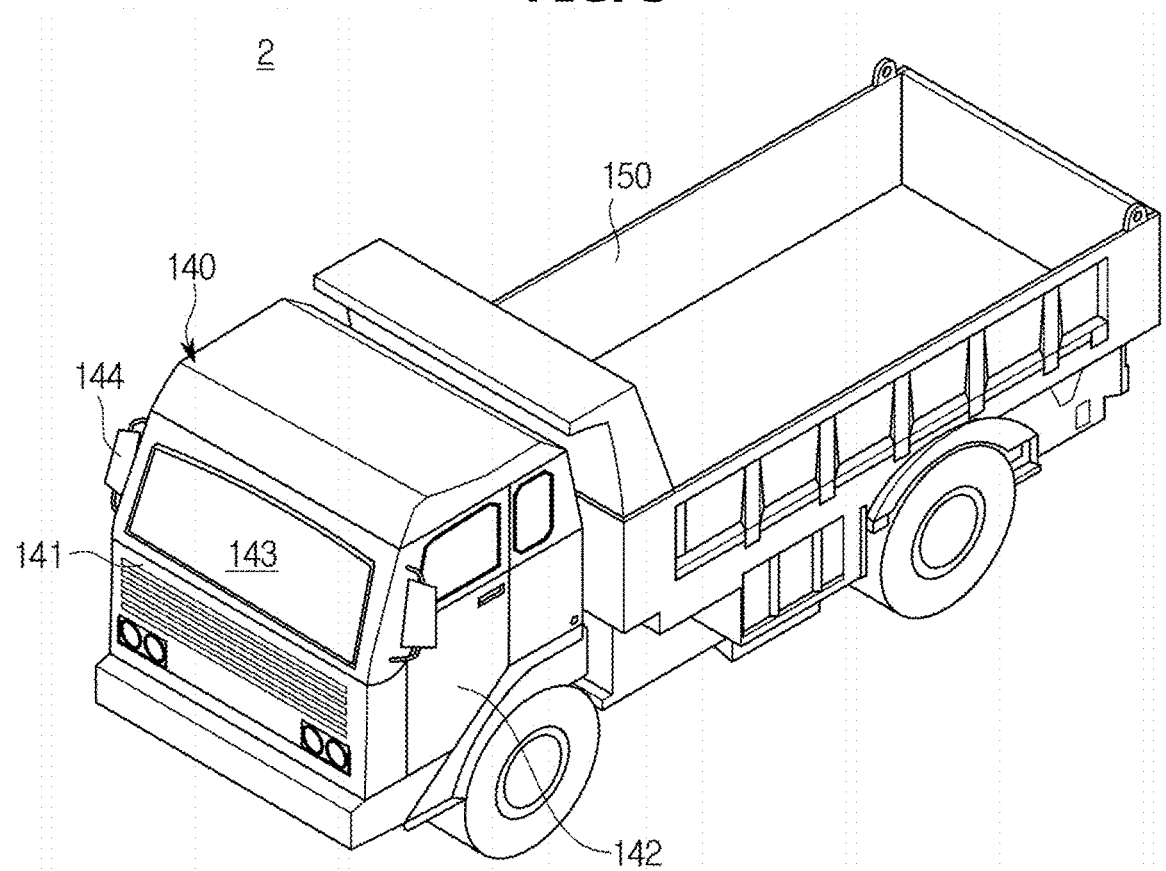
FIG. 3 shows an example of an external appearance of a truck according to an embodiment of the present disclosure.
Figure 4:
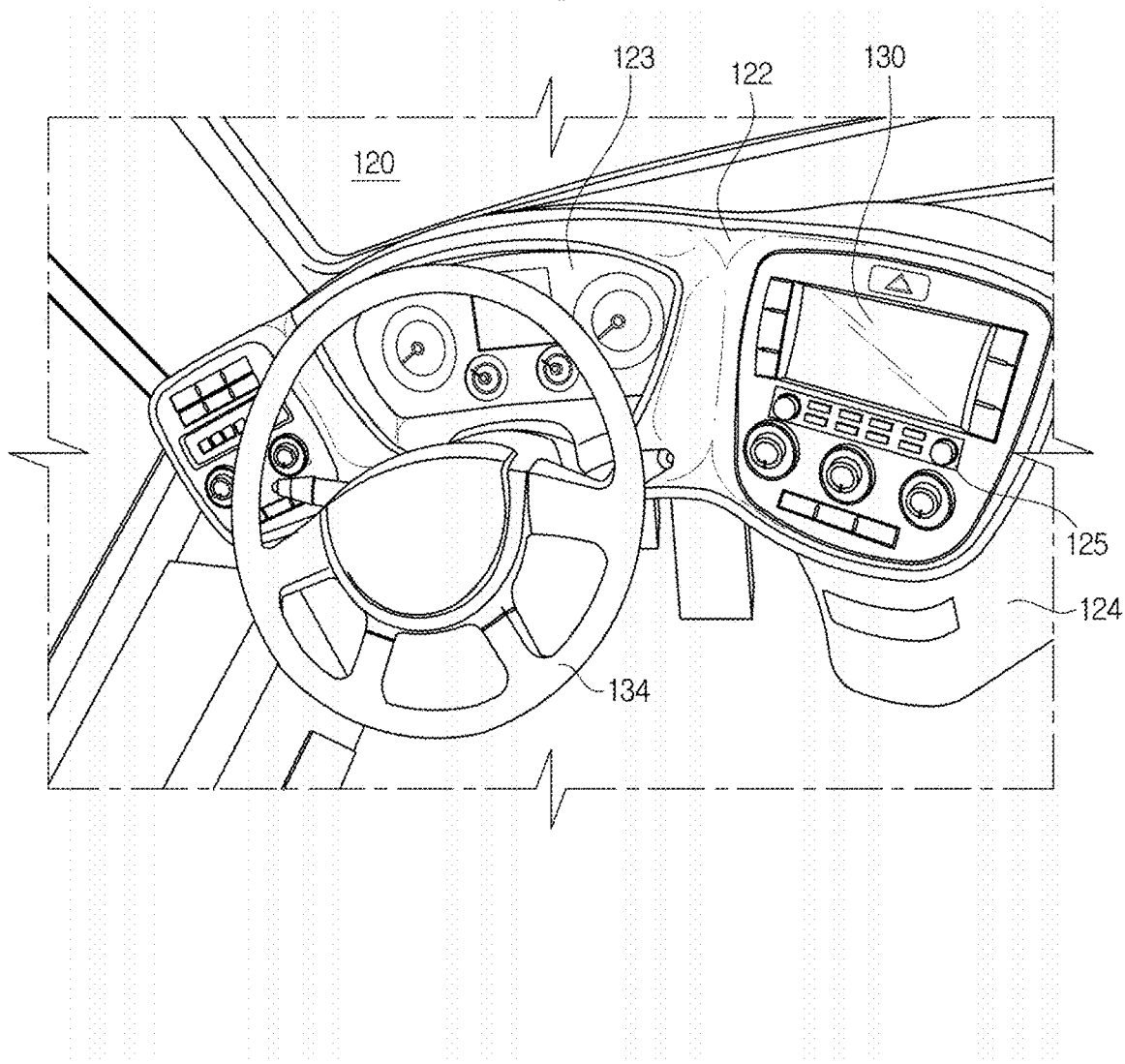
FIG. 4 shows an example of an interior of the truck shown in FIG. 3.

FIG. 3 shows an example of an external appearance of a truck according to an embodiment of the present disclosure, and FIG. 4 shows an example of an interior of the truck shown in FIG. 3.

As shown in FIG. 3, a truck 2 may be a machine that travels on a road by driving wheels in order to transport goods. The truck 2 may include a tractor 140 having power, and a trailer 150 detachably connected to the tractor 140 to load goods therein.

The tractor 140 may draw the trailer 150, and include a body having an interior and an exterior, and a chassis which is the remaining portion except for the body and in which a mechanism required for driving is installed.

The exterior of the body may include a hood 141, left and right doors 142 disposed in the front portion of the body, window glass 143, and a plurality of west coast mirrors 144 to provide a user with a rear view of the truck 2.

The trailer 150 may load various kinds of goods therein. Goods loaded in the trailer 150 may include humans as well as things.

The trailer 150 may be moved by power of the tractor 140 to transport goods loaded therein.

As shown in FIG. 4, the interior of the truck 2 may be similar to that of the passenger vehicle 1.

Hereinafter, the same components as those of the interior of the passenger vehicle 1 will be assigned the same reference numerals.

The interior 120 of the truck 2 may include a seat on which a passenger sits, a dashboard, an instrument panel (that is, a cluster 123), a center fascia 124, a head unit 125, an input device 126, and a display 127, and further include a terminal 130 for vehicle.

The chassis of the truck 2 may further include driving apparatuses for applying a driving force and a braking force to the front, rear, left, and right wheels, such as a power generating apparatus, a power transfer apparatus, a steering apparatus, a braking apparatus, a suspension apparatus, and a transmission apparatus.

The truck 2 may include an accelerator pedal that is pressed by a user according to the user's acceleration intention, a brake pedal that is pressed by the user according to the user's braking intention, and a steering wheel 134 of the steering apparatus for enabling the user to change a driving direction.

Figure 5:
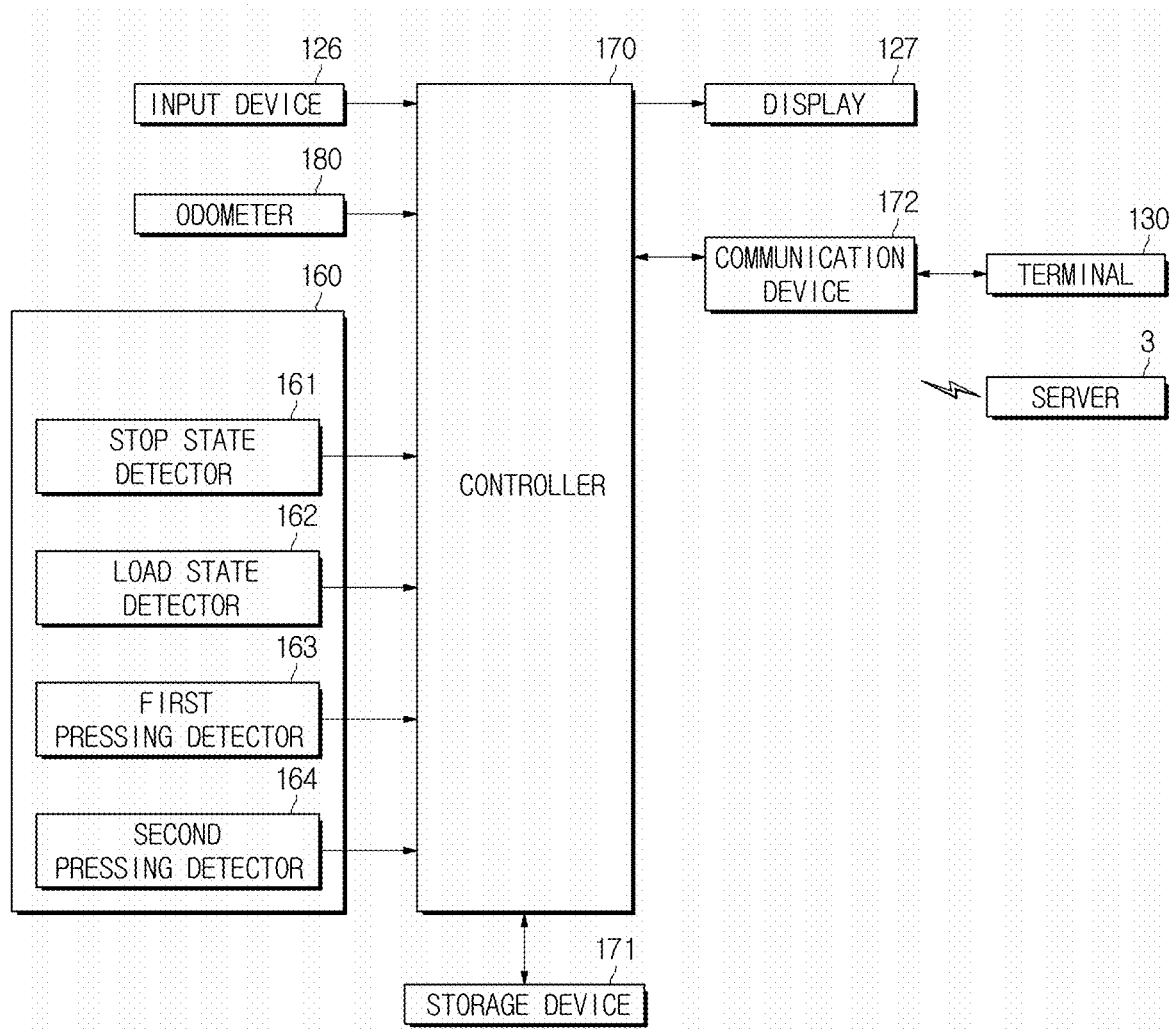
FIG. 5 is a control block diagram of a vehicle according to an embodiment of the present disclosure.

FIG. 5 is a control block diagram of a vehicle according to an embodiment of the present disclosure.

The vehicle may include an input device 126, a display 127, a detector 160, a controller 170, a storage device 171, and a communication device 172.

The vehicle may communicate with an external server 3 through the communication device 172.

The input device 126 may receive a command for outputting fuel efficiency information, and receive refueling information during refueling.

Herein, the refueling information may include cost (cost of refueling) of fuel such as gasoline or diesel and an amount (fuel flow) of refueled fuel.

The input device 126 may receive a command for turning on/off the navigation mode, and receive information of at least one of a stop and a destination when the navigation mode is executed.

The input device 126 may receive information for selecting any one path from among a plurality of paths found in an area from a current location to a destination.

The input device 126 may receive information corresponding to weight of goods.

The input device 126 may receive information about the number of passengers or total weight of passengers.

The input device 126 may receive information about whether the vehicle stops.

The input device 126 may include a hardware device, such as various buttons or switches, a pedal, a keyboard, a mouse, a track-ball, various kinds of levers, a handle, and a stick, for the user's inputs.

Also, the input device 126 may include a Graphical User Interface (GUI) such as a touch pad, that is, a software device, for the user's inputs. The touch pad may be implemented as a Touch Screen Panel (TSP), and may be interlayered with the display 127.

The input device 126 and the display 127 may be implemented as a touch screen having an interlayer structure.

If the vehicle changes from a driving state to a stop state, the display 127 may display information of fuel efficiency from time at which the vehicle started traveling to time at which the vehicle stops.

When the navigation mode is executed, the display 127 may display a path to a destination, and display fuel efficiency information for each course of the path.

If there are a plurality of paths to the destination, the display 127 may display driving time and a driving distance corresponding to each path, and display fuel efficiency information of each path. Also, the display 127 may display fuel efficiency information for each course of each path.

The display 127 may further display information about cost of fuel and an amount of fuel, and display fuel efficiency information of when goods are loaded and fuel efficiency information of when no goods are loaded.

The display 127 may display information for improving driving habits in order to reduce fuel efficiency.

The information displayed on the display 127 may be displayed through the terminal 130.

The display 127 may be a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECD) panel, a Light Emitting Diode (LED) panel, or an Organic Light Emitting Diode (OLED) panel, although not limited to these.

The detector 160 may detect state information of the vehicle in order to acquire fuel efficiency information of the vehicle.

That is, the detector 160 may detect a stop state and a load state of the vehicle, and detect information corresponding to a driver's driving habits.

The detector 160 may include a stop state detector 161, a load state detector 162, a first pressing detector 163, and a second pressing detector 164.

The stop state detector 161 may detect state information of the vehicle in order to determine whether the vehicle is in a stop state or in a driving state.

The stop state detector 161 may include a speed detector to detect driving speed of the vehicle.

The speed detector may include a plurality of wheel speed sensors to output detection information (that is, wheel speed information) corresponding to rotation speed of the front, rear, left, and right wheels of the vehicle.

The speed detector may include an acceleration sensor to output detection information (that is, acceleration information) corresponding to acceleration of the vehicle.

The speed detector may include all of the plurality of wheel speed sensors and the acceleration sensor.

Also, the stop state detector 161 may include an ignition detector to detect turning on/off of the ignition, and include an image detector to acquire images of a road (or a road surface).

The load state detector 162 may detect goods-loaded information and goods-unloaded information, and detect weight of goods when the goods are loaded.

The load state detector 162 may include a weight detector to detect weight of loaded goods.

The load state detector 162 may detect information of passengers in the vehicle.

That is, the load state detector 162 may include a weight detector to detect detection information (that is, weight information) corresponding to weight of passengers in the vehicle.

The weight detector may be installed in a trailer, a trunk, or a seat.

The load state detector 162 may detect the number of passengers. The load state detector 162 may be installed in a seat or a seat belt to detect information about whether a passenger is seated.

The first pressing detector 163 and the second pressing detector 164 may be detectors to detect information corresponding to the driver's driving habits.

That is, the first pressing detector 163 may be installed in an acceleration pedal 132, and output detection information (that is, pressure information) corresponding to pressure applied to the acceleration pedal 132.

The second pressing detector 164 may output detection information (that is, pressure information) corresponding to pressure applied to the brake pedal 133.

The second pressing detector 164 may be installed in the brake pedal 133.

The second pressing detector 164 may detect brake oil pressure of brake system.

The detector 160 may further include a fuel amount detector to detect an amount of fuel filled in a gas tank.

The fuel amount detector may be a fuel weight detector to detect weight of fuel, or a level detector to detect a height level of fuel filled in the gas tank.

Also, the detector may further include a level detector to detect a height level of fuel filled in the gas tank.

The controller 170 may be implemented with memory to store algorithms for controlling the operation of components in the vehicle or data of programs for executing the algorithms, and a processor to perform the above-described operations using the data stored in the memory. The memory and the processor may be implemented as separate chips, or the memory and the processor may be implemented as a single chip.

The controller 170 may acquire stop state information and load state information based on detection information detected by the stop state detector 161 and the load state detector 162, acquire acceleration information and braking information based on detection information detected by the first pressing detector 163 and the second pressing detector 164, and acquire information about the user's driving habits based on the acquired acceleration information and braking information.

The load state information may be information for determining whether or not goods are loaded. The load state information may further include weight information of goods.

The information about the driver's driving habits may include acceleration information and braking information for each driving distance for ensuring reference fuel efficiency for each weight, and further include information for improving the driver's driving habits in correspondence to the acceleration information and braking information for each driving distance.

The controller 170 may determine whether the vehicle is in a stop state or in a driving state, based on driving speed of the vehicle.

The controller 170 may acquire driving speed of the vehicle based on detection information output from the plurality of wheel speed sensors.

The controller 170 may acquire driving speed of the vehicle based on detection information output from the acceleration sensor.

The controller 170 may acquire driving speed of the vehicle based on detection information output from the plurality of wheel speed sensors and detection information output from the acceleration sensor.

The controller 170 may receive driving distance information from the odometer 180.

The controller 170 may acquire a driving distance based on driving time and driving speed.

The controller 170 may acquire a driving distance based on information of a change in location received from a Global Positioning System (GPS) receiver, or acquire a driving distance based on navigation information of the terminal 130.

The controller 170 may receive load state information and stop state information through the input device 126.

The controller 170 may acquire fuel efficiency information based on stop state information, load state information, driving distance information, and driving habit information, acquire fuel cost information based on refueling information and the fuel efficiency information, and control the outputs of the fuel efficiency information and the fuel cost information.

Herein, the refueling information may include cost of fuel and fuel flow. The controller 170 may receive the refueling information through an external server, or receive an input of the refueling information through the input device.

More specifically, if the vehicle changes to a driving state from a stop state, the controller 170 may measure weight of goods. If the measured weight of goods is zero, the controller 170 may determine that the vehicle loads no goods therein, and if the measured weight of goods is not zero, the controller 170 may determine that the vehicle loads goods therein, and store the measured weight of goods.

The controller 170 may store a location of the vehicle at time of departure.

If the vehicle changes from the driving state to the stop state, the controller 170 may measure weight of goods. If the measured weight of goods is different from the stored weight of goods, the controller 170 may set a path between the location of the vehicle at the time of departure and a current location of the vehicle to a course, acquire fuel efficiency information of the course, store the acquired fuel efficiency information, and control the display 127 to display the acquired fuel efficiency information.

The controller 170 may compare a difference between the measured weight of goods and the stored weight of goods to a reference range, in consideration of an error of the measured weight of goods. That is, if the controller 170 determines that the difference between the measured weight of goods and the stored weight of goods is out of the reference range, the controller 170 may acquire fuel efficiency information of the course.

Herein, the course may be a course between the location of the vehicle at the time of departure and the current location of the vehicle.

The controller 170 may create identification information of the course when acquiring the fuel efficiency information, and control the display 127 to display the created identification information of the course together with the fuel efficiency information.

The controller 170 may match the identification information of the course with a map, and control the display 127 to display the identification information of the course on the map.

If the current location of the vehicle is a destination, the controller 170 may divide a path from the point of departure to the destination into several courses based on stop state information and load state information (information about a change in weight of goods), acquire fuel efficiency information for each course, and control the display 127 to display the acquired fuel efficiency information for each course.

More specifically, if the path from the point of departure to the destination is one course, the controller 170 may control the display 127 to display fuel efficiency information of the course, and if a stop exists between the point of departure and the destination, the controller 170 may control the display 127 to display fuel efficiency information of a course between the point of departure and the stop and fuel efficiency information of another course between the stop and the destination.

Also, if a plurality of stops exist between the point of departure and the destination, the controller 170 may control the display 127 to display fuel efficiency information of a course between the point of departure and the first stop, fuel efficiency information of another course between two neighboring stops, and fuel efficiency information of another course between the final stop and the destination.

If the navigation mode is selected and destination information is received, the controller 170 may search a path from a current location to the destination, and compare the found path to paths stored in the storage device 171. If the found path is identical to any one of the paths stored in the storage device 171, the controller 170 may control the display 127 to display fuel cost information and fuel efficiency information for each course of the identical path stored in the storage device 171.

If a plurality of paths are found, the controller 170 may compare the found paths to the paths stored in the storage device 171, detect at least one path that is identical to the found paths from among the paths stored in the storage device 171, and control the display 127 to display fuel cost information and fuel efficiency information for each course of the at least one path.

The controller 170 may find a current location based on location information received from the GPS receiver, acquire fuel efficiency information of a course between the current location and the point of departure, store the acquired fuel efficiency information, and control the display 127 to display the acquired fuel efficiency information.

The controller 170 may acquire information about a total driving distance, a driving distance for one day, average fuel efficiency for one day, fuel cost for one day, and average fuel efficiency, whenever driving is completed, and store the acquired information.

Herein, the information about the total driving distance, the driving distance for one day, the average fuel efficiency for one day, the fuel cost for one day, and the average fuel efficiency may be acquired separately according to when the vehicle loads goods therein and when the vehicle loads no goods therein, and the acquired information may be stored.

The controller 170 may detect the driver's driving habits for the path from the point of departure to the destination, based on acceleration information and braking information, and control the display 127 to display information for improving the driver's driving habits.

The controller 170 may control the display 127 to display information of a change in fuel efficiency corresponding to the driver's driving habits.

That is, the controller 170 may control the display 127 to display information about whether fuel efficiency increases or decreases according to the driver's driving habits, and to display a degree of an increase in fuel efficiency according to an improvement of the driver's driving habits.

The controller 170 may detect the driver's driving habits for each course of the path, and control the display 127 to display the driver's driving habits for each course of the path.

The storage device 171 may store information of the point of departure, information of the stop, and information of the destination, and store information of at least one path corresponding to the information of the point of departure and the information of the destination.

The storage device 171 may store fuel efficiency information for each course of the path.

The storage device 171 may store reference fuel efficiency information corresponding to weight and a driving distance.

That is, the storage device 171 may store reference fuel efficiency information for each weight, reference fuel efficiency information for each driving distance, and reference fuel efficiency information for each weight and for each driving distance.

More specifically, the storage device 171 may store fuel efficiency information of a course between a point of departure and a stop, fuel efficiency information of another course between two different stops, and fuel efficiency information of another course between a stop and a destination.

The storage device 171 may further store distance information and cost information of consumed fuel for each course of the path.

The storage device 171 may store a total driving distance, a driving distance for one day, average fuel efficiency for one day, fuel cost for one day, and average fuel efficiency.

The storage device 171 may store a total driving distance, a driving distance for one day, average fuel efficiency for one day, fuel cost for one day, and average fuel efficiency separately according to when the vehicle loads goods therein and when the vehicle loads no goods therein.

The storage device 171 may update the total driving distance, the driving distance for one day, the average fuel efficiency for one day, the fuel cost for one day, and the average fuel efficiency, whenever the vehicle travels.

The storage device 171 may be implemented as at least one among a non-volatile memory device, such as Read Only Memory (ROM), Programmable Read Only Memory (PROM), an Erasable Programmable Read Only Memory (EPROM), and a flash memory, a volatile memory device such as Random Access Memory (RAM), or storage medium, such as Hard Disk Drive (HDD) or Compact Disk-Read Only Memory (CD-ROM), although not limited to these. The storage device 171 may be memory implemented as a separate chip from the processor described above in regard of the controller 170, or the storage device 171 and the processor may be implemented as a single chip.

The communication device 172 may perform communication between the controller 170 and the terminal 130.

The communication device 172 may transfer load state information to the terminal 130.

The communication device 172 may transmit information about pressure applied to the accelerator pedal and the brake pedal to the terminal 130.

If destination information is received through the input device 126, the communication device 172 may transmit the destination information to the terminal 130.

The communication device 172 may perform Controller Area Network (CAN) communication, Universal Serial Bus (USB) communication, Wireless-Fidelity (Wi-Fi) communication, and Bluetooth communication, and may further perform broadcasting communication, such as DMB TPEG, SXM, and RDS, and 2G, 3G, 4G, and 5G communication.

The communication device 172 may perform communication between apparatuses in the vehicle.

The communication device 172 may include one or more components to enable communication with an external device. For example, the communication device 172 may include at least one of a short-range communication module, a wired communication module, and a wireless communication module.

The short-range communication module may include various kinds of short-range communication modules, such as a Bluetooth module, an infrared communication module, a Radio Frequency Identification (RFID) communication module, a Wireless Local Access Network (WLAN) communication module, a Near Field Communication (NFC) module, a Zigbee communication module, and the like, which transmit/receive signals through a wireless communication network at a short range.

The wired communication module may include various cable communication modules, such as a Universal Serial Bus (USB), a High Definition Multimedia Interface (HDMI), a Digital Visual Interface (DVI), Recommended Standard-232 (RS-232), power line communication, Plain Old Telephone Service (POTS), and the like, as well as various kinds of wired communication modules, such as a Controller Area Network (CAN) communication module, a Local Area Network (LAN) module, a Wide Area Network (WAN) module, a Value Added Network (VAN) module, and the like.

The wireless communication module may include wireless communication modules supporting various wireless communication methods, such as Global System for Mobile Communication (GSM), Code Division Multiple Access (CDMA), Wideband Code Division Multiple Access (W-CDMA), Universal Mobile Telecommunications System (UMTS), Time Division Multiple Access (TDMA), Long Term Evolution (LTE), and the like, as well as a Wireless-Fidelity (Wi-Fi) module and a Wireless Broadband (WiBro) module.

The wireless communication module may include a wireless communication interface including an antenna and a transmitter to transmit signals. Also, the wireless communication module may further include a signal conversion module to modulate a digital control signal output from the controller 170 through the wireless communication interface into an analog wireless signal under the control of the controller 170.

The wireless communication module may include a wireless communication interface including an antenna and a receiver to receive signals. Also, the wireless communication module may further include a signal conversion module to demodulate an analog wireless signal received through the wireless communication interface into a digital control signal.

The communication module 172 may include a GPS receiver to communicate with a plurality of satellites and to recognize a current location based on information provided from the plurality of satellites.

That is, the GPS receiver may receive signals transmitted from a satellite to recognize a current location of the vehicle, and transmit information of the current location to the controller 170.

The communication device 172 may communicate with the external server 3 to receive refueling information from the external server 3.

The external server 3 may be a server to provide card payment information, a server to provide mileage information of an oil supplier, or a communication company server of a user terminal.

The communication device 172 may communicate with a user terminal.

The communication device 172 may receive refueling information paid through the user terminal.

The user terminal may be implemented as a computer or a portable terminal that can connect to the vehicle through a network. Herein, the computer may include, for example, a notebook computer with a WEB browser, a desktop computer, a laptop computer, a tablet PC, a slate PC, and the like, and the portable terminal, which is, for example, a wireless communication apparatus ensuring portability and mobility, may include all kinds of Handheld-based wireless communication apparatuses, such as Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), a Wireless Broadband Internet (Wibro) terminal, a smart phone, and the like, and a wearable device, such as a watch, a ring, a bracelet, an ankle bracelet, a necklace, glasses, contact lens, or a head-mounted-device (HMD).

The vehicle may further include at least one of the terminal 130 and the odometer 180.

The terminal 130 may include a display, and further include an input device.

The terminal 130 may further include a communication interface for communicating with the controller 170, and further include a processor for providing fuel efficiency information.

The terminal 130 may display fuel efficiency information provided from the controller 170. That is, the terminal 130 may perform the same display function as the display 127.

The terminal 130 may display a goods-loaded state or a goods-unloaded state, and display information of an amount of loaded goods when the vehicle loads the goods therein.

The information of the amount of loaded goods may be displayed as weight, or as "small", "medium", and "large" based on weight ranges.

If the vehicle changes from a driving state to a stop state, the terminal 130 may display information of fuel efficiency from time at which the vehicle has started traveling to time at which the vehicle stops.

If the navigation mode is selected, the terminal 130 may search a path from a current location to a destination, based on current location information, map information stored in database, and information of the destination input by the user, match the found path with the map information to display the path on the map, and provide the user with path guide information in the forms of an image and sound.

If a stop is added between the current location and the destination, the terminal 130 may search a path connecting the current location, the stop, and the destination, and match the found path with the map information to display the path on the map.

The terminal 130 may display fuel efficiency information for each course of the path.

If a plurality of paths from the current location to the destination are found, the terminal 130 may display driving time and a driving distance corresponding to each path, display fuel efficiency information of each path, and also display fuel efficiency information for each course of each path.

The terminal 130 may further display refueling information, and display fuel efficiency information of when the vehicle loads goods therein and fuel efficiency information of when the vehicle loads no goods therein.

Herein, the refueling information may include information about cost of refueling and fuel flow.

The terminal 130 may display information for improving driving habits to reduce fuel efficiency.

The terminal 130 may receive load state information from the controller 170 of the vehicle, acquire fuel efficiency information of the vehicle based on the load state information, and display the fuel efficiency information.

The terminal 130 may include a GPS receiver to recognize a current location.

More specifically, the terminal 130 may receive a current location from the GPS receiver, recognize driving speed of the vehicle based on a change in current location, and determine whether the vehicle stops or travels, based on the recognized driving speed.

Also, the terminal 130 may receive information corresponding to a stop state and a driving state from the controller 170.

If the vehicle stops, the terminal 130 may check load state information, and if the vehicle changes from the stop state to a driving state, the terminal 130 may acquire fuel efficiency information based on the load state information, acceleration information and braking information of the vehicle, and driving distance information. If the vehicle again changes to the stop state, the terminal 130 may display the acquired fuel efficiency information.

The terminal 130 may recognize acceleration information and braking information based on the recognized driving speed, and recognize driving distance information based on a change in recognized location.

Also, the terminal 130 may receive driving distance information, acceleration information, and braking information from the controller 170.

Also, the terminal 130 may receive load state information, and receive refueling information.

The terminal 130 may receive at least one of destination information and stop information.

The odometer 180 may acquire a driving distance of the vehicle based on rotation information of the wheels detected by the plurality of wheel speed sensors, and display the acquired driving distance.

The odometer 180 may transmit information about the driving distance to the controller 170, and also transmit the information about the driving distance to the terminal 130.

Herein, the information about the driving distance may include a total driving distance of the vehicle, and a driving distance of the vehicle for a time period from time at which the vehicle starts to time at which the vehicle arrives at a destination.

Figure 6:
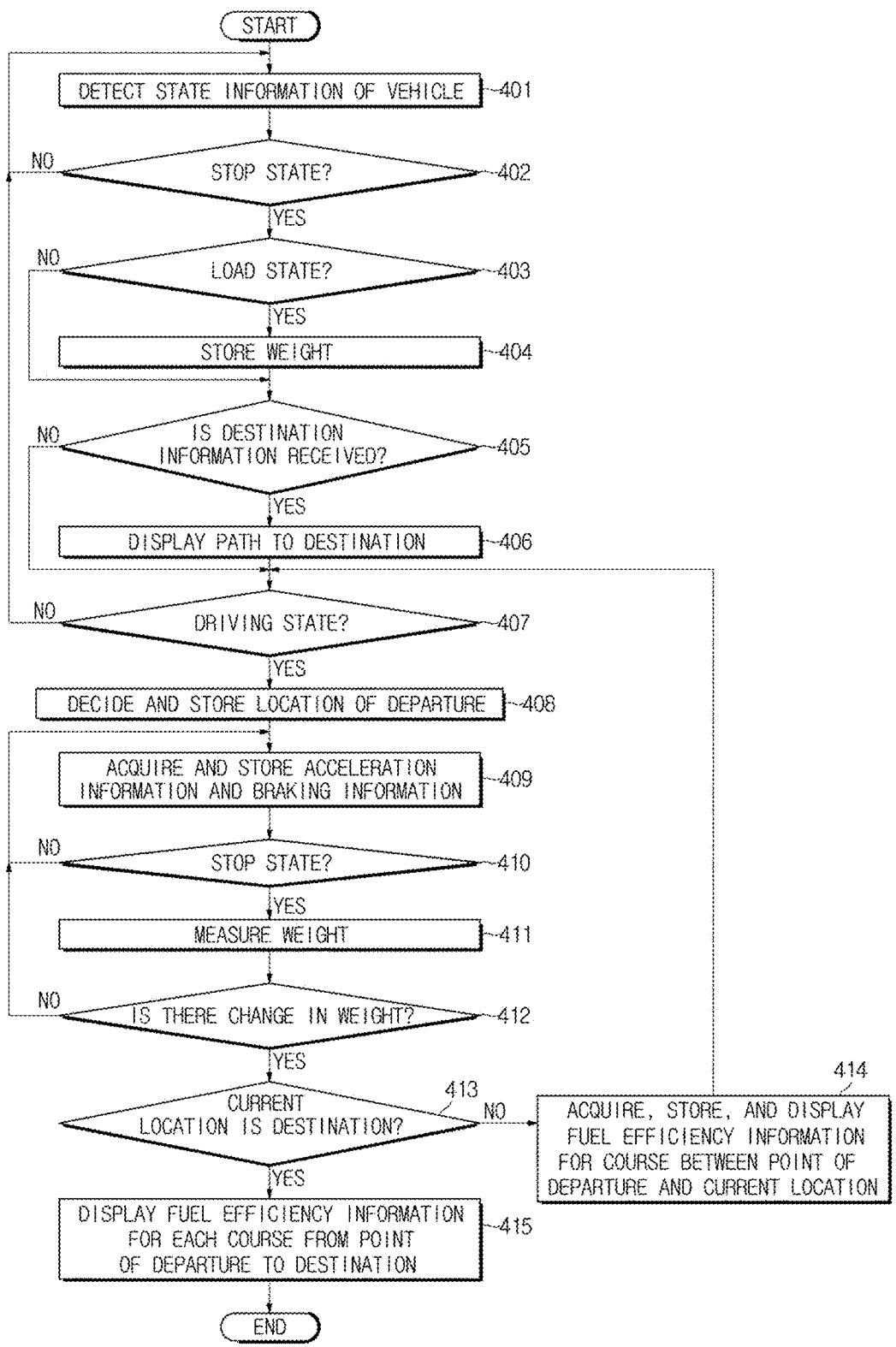
FIG. 6 is a flowchart illustrating a method of controlling a vehicle according to an embodiment of the present disclosure.

FIG. 6 is a flowchart illustrating a method of controlling a vehicle according to an embodiment of the present disclosure. The control method will be described with reference to FIGS. 7 to 11, below.

In the current embodiment, the vehicle is assumed to be a truck that can load goods.

If the ignition is turned on, the vehicle may supply driving power to components installed therein, and detect information corresponding to a state of the vehicle using a detector, in operation 401.

Herein, the state of the vehicle may include a stop state of the vehicle and a goods-loaded state.

More specifically, the vehicle may acquire driving speed based on rotation speed of wheels detected by a speed sensor, and determine whether it is in the stop state, based on the acquired driving speed, in operation 402.

If the driving speed is 0 km/h, the vehicle may determine that it is in the stop state, and if the driving speed is not 0 km/h, the vehicle may determine that it is in a driving state.

Also, if the ignition changes from a turn-off state to a turn-on state, the vehicle may determine that it is in the stop state. That is, operation of determining whether the vehicle is in the stop state may be omitted.

If the vehicle determines that it is in the stop state, the vehicle may acquire weight of goods based on detection information detected by the load state detector 162, and determine whether it is in a goods-loaded state in which goods is loaded in the vehicle or in a goods-unloaded state in which no goods is loaded in the vehicle, based on the acquired weight of goods, in operation 403.

If the vehicle determines that it is in the goods-loaded state, the vehicle may store the weight of goods which is load information, in operation 404. Meanwhile, if the vehicle determines that it is in the goods-unloaded state, the vehicle may store unload information or 0 kg.

If destination information is received through the input device 126, in operation 405, the vehicle may search a path from a current location to the destination, and display the found path through the terminal 130, in operation 406.

Figure 7:
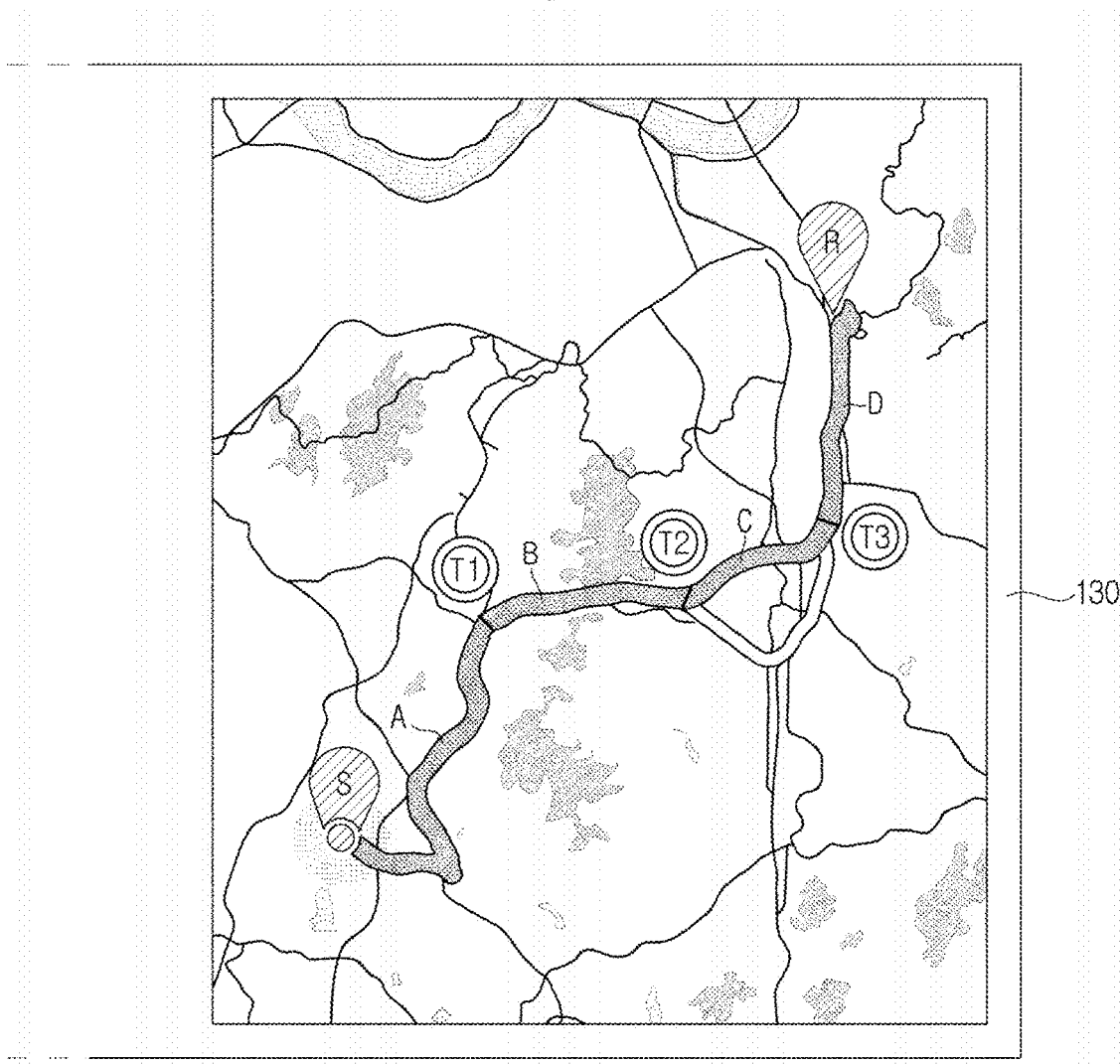

As shown in FIG. 7, if destination information is received, the terminal 130 of the vehicle may display a path from a point S of departure to a destination R.

Also, if the terminal 130 determines that there are stops T1, T2, and T3 between the point S of departure and the destination R, based on path information stored in the storage device 171, the terminal 130 of the vehicle may display the stops T1, T2, and T3 on the path, together with the path between the point S of departure and the destination R.

A truck, which is a commercial vehicle, may repeat work of transporting goods to at least one predetermined location for a predetermined time period. Therefore, information of stops, as well as a path between a point of departure and a destination may be stored in the terminal 130 of the truck.

The vehicle may check rotation speed of wheels detected by a speed detector, in order to determine whether the vehicle changes to a driving state.

That is, if driving speed is not 0 km/h, the vehicle may determine that it is in the driving state, in operation 407.

At this time, the vehicle may determine that it starts at its current location to decide a location of departure, and store the location of departure, in operation 408.

The vehicle may check an amount of fuel at time of departure, and store information about the amount of fuel.

The vehicle may receive a total driving distance from the odometer 180 at the time of departure, and store information about the total driving distance.

If the vehicle changes to a driving state when no destination information is received, the vehicle may determine that it starts, receive a total driving distance from the odometer 180, and store information about the total driving distance.

Also, the vehicle may store information of a current location received by the GPS receiver when the vehicle starts.

The vehicle may acquire acceleration information and braking information corresponding to detection information detected by the first and second pressing detectors 163 and 164, while traveling, and store the acceleration information and the braking information, in operation 409.

The vehicle may determine whether driving speed is 0 km/h, in order to determine whether it changes to a stop state while traveling.

If the driving speed is 0 km/h, the vehicle may determine that it is in the stop state, in operation 410. Then, the vehicle may measure weight of goods loaded in the trailer, in operation 411, and determine whether the measured weight of goods is equal to stored weight.

That is, if the vehicle changes to the stop state, the vehicle may determine whether there is a change in weight of loaded goods, in operation 412.

If the vehicle determines that there is a change in weight of goods, the vehicle may determine whether its current location is a destination, in operation 413. If the current location is not the destination, the vehicle may store the current location as a stop, acquire fuel efficiency information of a course between the point of departure and the current location (that is, the stop), match the fuel efficiency information with information of the stop, store the result of the matching, and display the result of the matching through the terminal 130 or the display 127, in operation 414.

When acquiring the fuel efficiency information, the vehicle may search information of a path from the point of departure to the current location based on navigation information, detect an amount of fuel filled in the gas tank, compare the detected amount of fuel to an amount of fuel stored at time of departure to acquire an amount of consumed fuel, acquire a driving distance based on the path information, and acquire the fuel efficiency information based on the driving distance and the amount of consumed fuel.

Herein, the amount of consumed fuel may be information detected by the fuel amount detector.

Also, if no navigation information is received, the vehicle may acquire a current total driving distance from the odometer 180, calculate a difference between the total driving distance stored at the time of departure and the current total driving distance, and acquire the fuel efficiency information based on the difference and the amount of consumed fuel.

Herein, the difference between the total driving distance stored at the time of departure and the current total driving distance may be a driving distance from the point of departure to the current location.

The vehicle may estimate fuel cost for each unit fuel (1 L) based on refueling information, calculate cost of fuel consumption for the course between the point of departure and the current location (that is, the stop) based on the fuel cost and the fuel efficiency, and display the cost of fuel consumption.

Herein, the refueling information may be received through an external server or the input device 126.

Figure 8A:
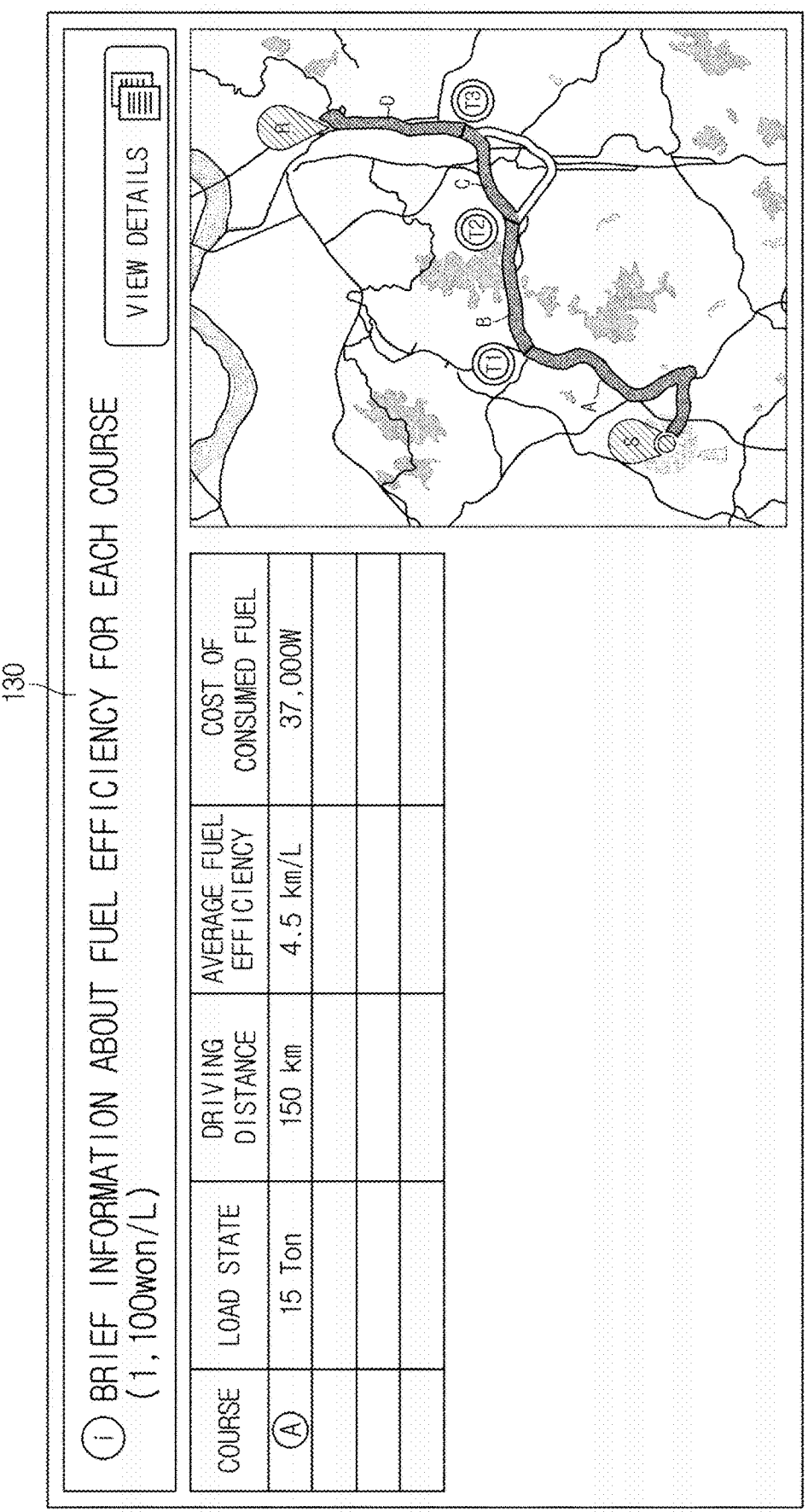

As shown in FIG. 8A, if the vehicle starts at a point S of departure and arrives at a stop T1, the vehicle may set a path between the point S of departure and the stop T1 to a course A, match the course A with navigation information to display the course A on the navigation information through the terminal, and display fuel efficiency information for the course A between the point S of departure and the stop T1 in another area that is different from an area on which the navigation information is displayed.

Also, the terminal 130 of the vehicle may further display weight of loaded goods, a driving distance, fuel efficiency, cost of consumed fuel, and fuel cost for each unit fuel in the other area that is different from the area on which the navigation information is displayed.

Also, the vehicle may display path information, identification information of the course A, the point S of departure, the destination R, and the stop T1, together with map information, in the area on which the navigation information is displayed.

The vehicle may search reference fuel efficiency corresponding to the stored weight from reference fuel efficiency information for each weight, and compare the reference fuel efficiency to the acquired fuel efficiency. If the reference fuel efficiency is lower than the acquired fuel efficiency, the vehicle may determine a user's driving habits based on acceleration information and braking information, and display information for improving the user's driving habits.

Then, the vehicle may determine whether it is in a driving state, based on rotation speed of the wheels detected by the speed detector, in operation 407.

At this time, the vehicle may determine that it has started at the current location (that is, the stop T1), and store a location of the stop T1, in operation 408.

The vehicle may determine an amount of fuel at time which it has started at the stop T1, and store the amount of fuel.

The vehicle may acquire a total driving distance from the odometer 180 at the time at which the vehicle starts at the stop T1, and store the total driving distance.

The vehicle may acquire acceleration information and braking information corresponding to detection information detected by the first and second pressing detectors, while traveling, and store the acceleration information and the braking information, in operation 409.

The vehicle may determine whether driving speed is 0 km/h, in order to determine whether the vehicle changes to a stop state while traveling.

If the driving speed is 0 km/h, the vehicle may determine that it is in the stop state, in operation 410, measure weight of goods loaded in the trailer, in operation 411, and determine whether the measured weight of goods is equal to stored weight.

That is, if the vehicle changes to the stop state, the vehicle may determine whether there is a change in weight of loaded goods, in operation 412.

Meanwhile, if the vehicle determines that there is no change in weight of goods, operation of acquiring fuel efficiency information for a course from the stop T1 to a current location may be omitted.

Also, if a course creating command is input by the user when there is no change in weight of goods, the vehicle may acquire fuel efficiency information for the course from the stop T1 to the current location.

If there is no change in weight of goods, the vehicle may determine whether its current location is a destination. If the current location is not the destination, the vehicle may store the current location as a new stop, acquire fuel efficiency information for the course between the point of departure and the current location (that is, the new stop), match the acquired fuel efficiency information with information of the new stop to store the result of the matching, and display the result of the matching through the terminal 130 or the display 127, in operation 414.

Operation of acquiring the fuel efficiency information has been described above, and accordingly, a detailed description thereof will be omitted.

Figure 8B:
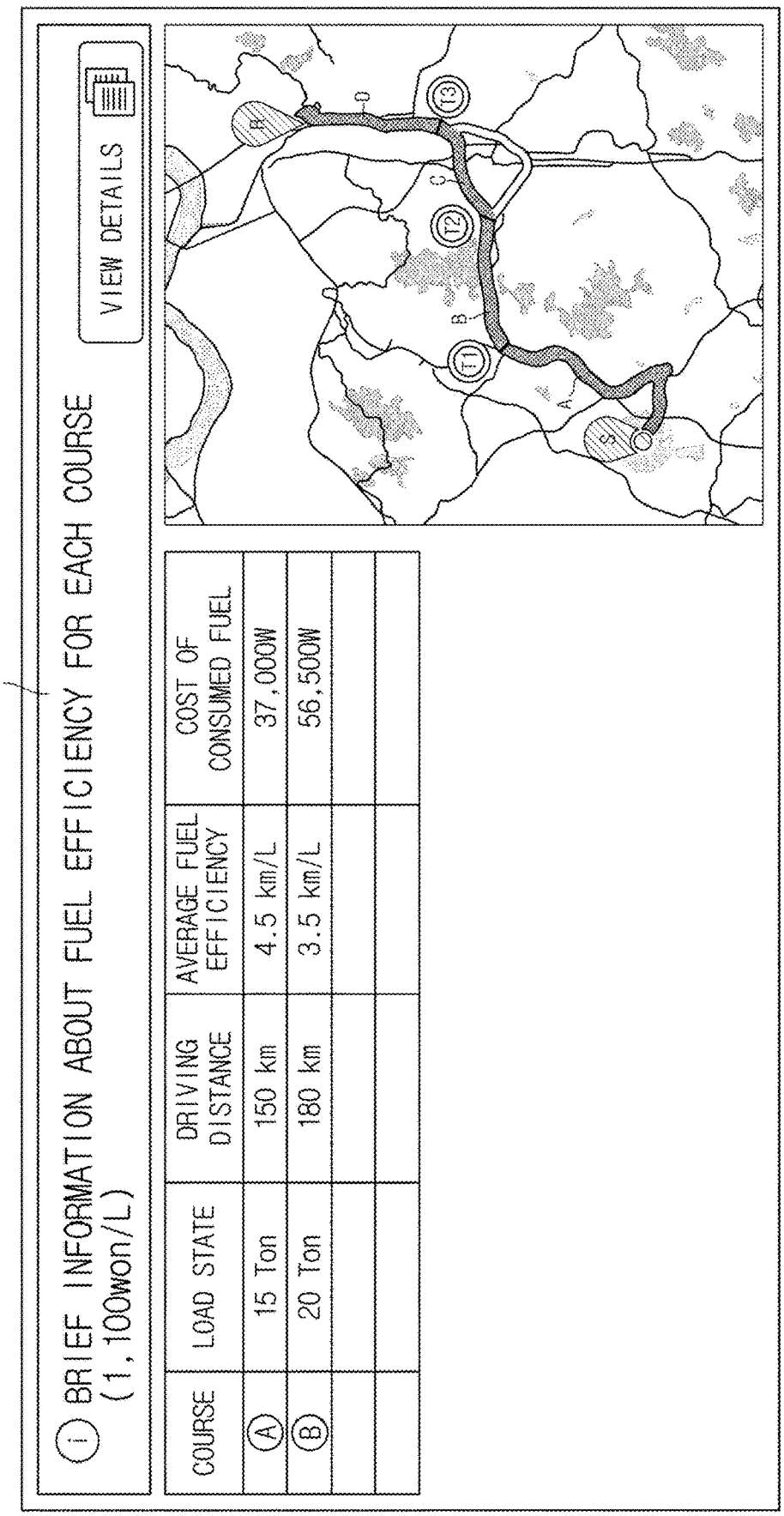

As shown in FIG. 8B, if the vehicle starts at the stop T1 and arrives at the stop T2, the vehicle may set a path between the stop T1 and the stop T2 to a course B, match the course B with navigation information to display the course B on the navigation information through the terminal 130, and display fuel efficiency information for the course B between the stop T1 and the stop T2 in another area that is different from an area on which the navigation information is displayed.

The terminal 130 of the vehicle may display the fuel efficiency information for the course A between the point S of departure and the stop T1, together with the fuel efficiency information for the course B between the stop T1 and the stop T2.

Also, the terminal 130 of the vehicle may display weight of loaded goods, driving distances, fuel efficiency, and cost of consumed fuel for the courses A and B in the other area that is different from the area on which the navigation information is displayed, and may further display fuel cost for each unit fuel for the courses A and B.

Also, the vehicle may display path information, identification information of the course A, the point S of departure, the destination R, and the stop T1, together with map information, in the area on which the navigation information is displayed.

If refueling is performed while the vehicle moves from the stop T1 to the stop T2, the vehicle may change fuel cost for each unit fuel based on current refueling information, or may calculate an average value of fuel cost for each unit fuel based on fuel cost for each unit fuel of previous refueling information, a remaining amount of fuel, and the current refueling information, and update fuel cost for each unit fuel based on the calculated average value of fuel cost.

The refueling information may be received from an external server or through the input device 126.

As shown in FIG. 8C, the vehicle may display fuel efficiency information for each course from the point S of departure to a current location, whenever it arrives at a stop.

If the vehicle determines that the current location is the destination R, the vehicle may acquire fuel efficiency information for a course between a stop and the destination R, match the fuel efficiency information with information of the destination R, store the result of the matching, and display the fuel efficiency information through the terminal 130 or the display 127, in operation 415.

Operation of acquiring the fuel efficiency information has been described above, and accordingly, a detailed description thereof will be omitted.

The vehicle may display fuel efficiency information for each course of the path from the point S of departure to the destination R.

Figure 8D:
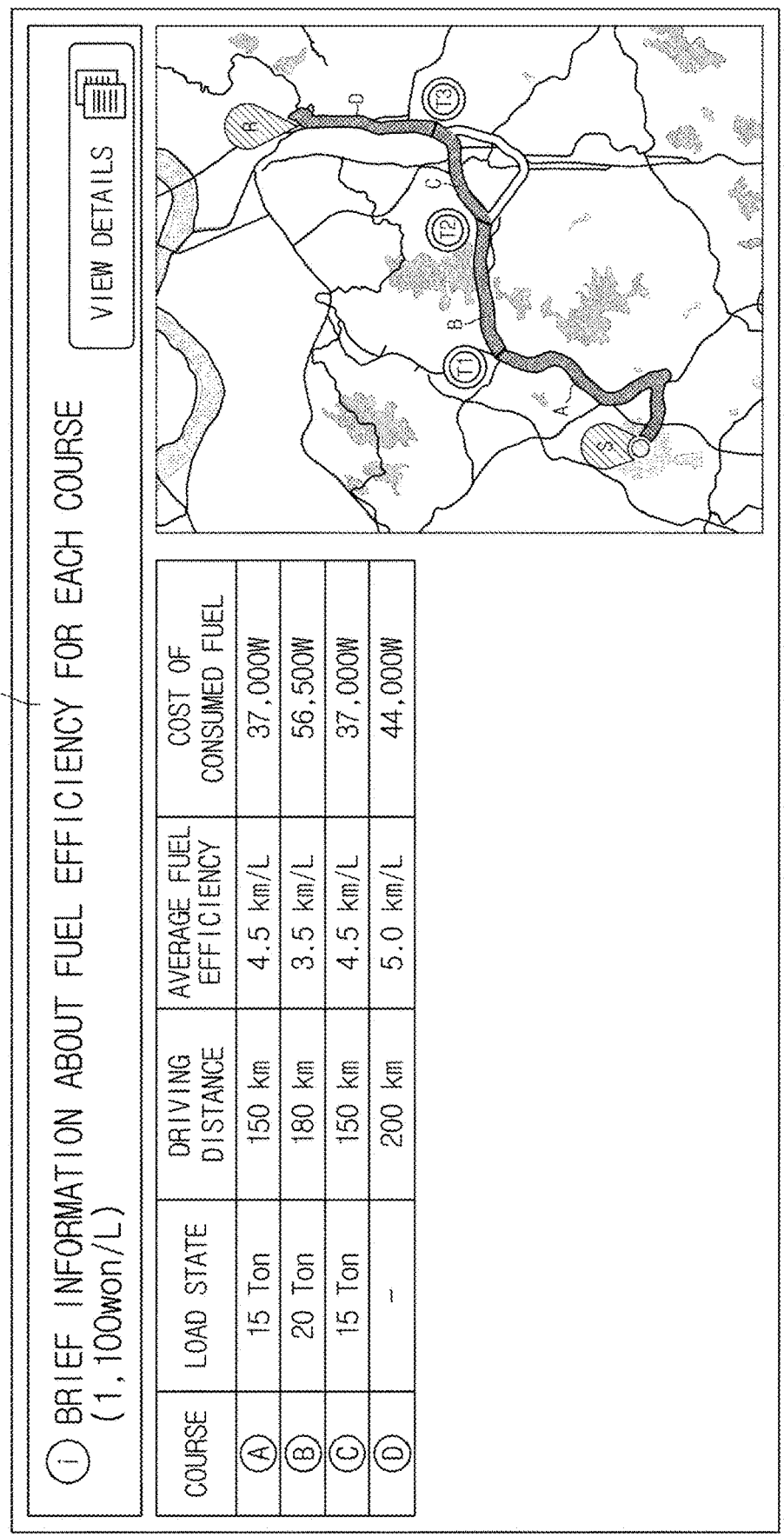

As shown in FIG. 8D, if the vehicle arrives at the destination R, the vehicle may display fuel efficiency information for each course of the path from the point S of departure and the destination R.

Figure 8E:
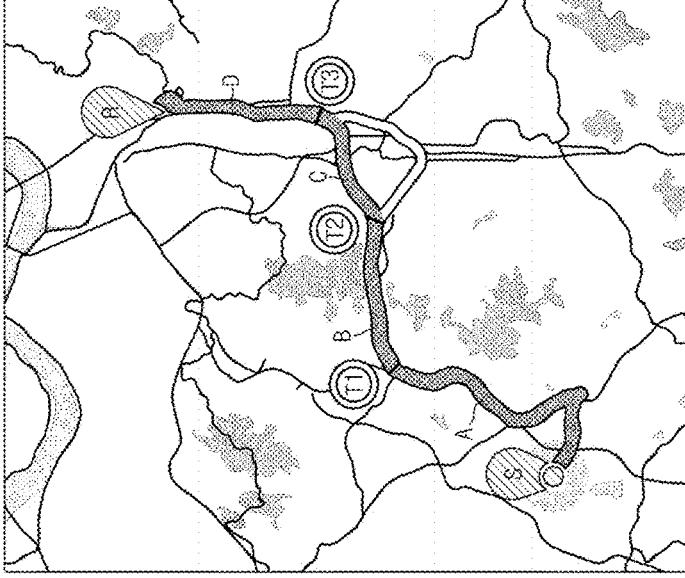

As shown in FIG. 8E, the vehicle may display information about a total driving distance, a driving distance for one day, average fuel efficiency for one day, fuel cost for one day, and average fuel efficiency, based on the user's command.

Herein, the information about the total driving distance, the driving distance for one day, the average fuel efficiency for one day, the fuel cost for one day, and the average fuel efficiency may be displayed separately according to when the vehicle loads goods therein and when the vehicle loads no goods therein.

The vehicle may display information for improving the user's driving habits for each course of the path from the point S of departure and the destination R.

If destination information is received, the vehicle may search a path from a current location and the destination, and determine whether the found path is identical to any one of paths stored in the storage device 171. If the vehicle determines that the found path is identical to one of the paths stored in the storage device 171, the vehicle may acquire fuel efficiency information for each course of the identical path stored in the storage device 171, and display fuel efficiency information for each course of the path.

Figure 9:
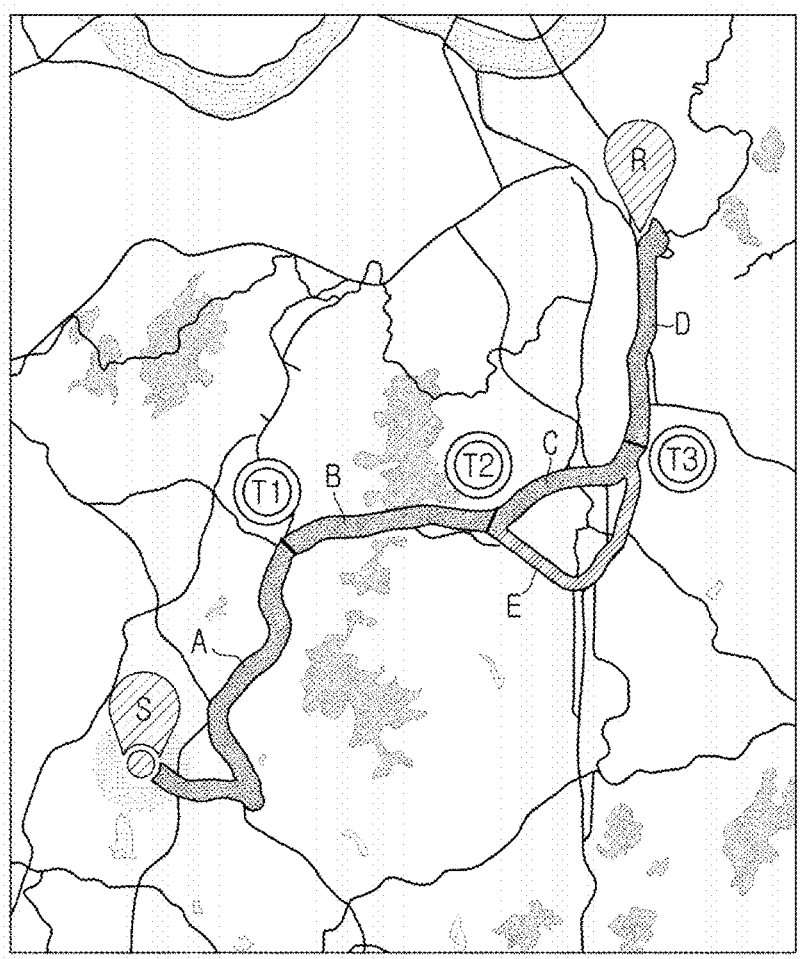

As shown in FIG. 9, if a plurality of different paths arriving at the destination from the current location are found, the vehicle may display the plurality of paths on the terminal 130.

Also, the vehicle may display information of a point of departure, a stop, and the destination on a map of the terminal 130.

Figure 10:
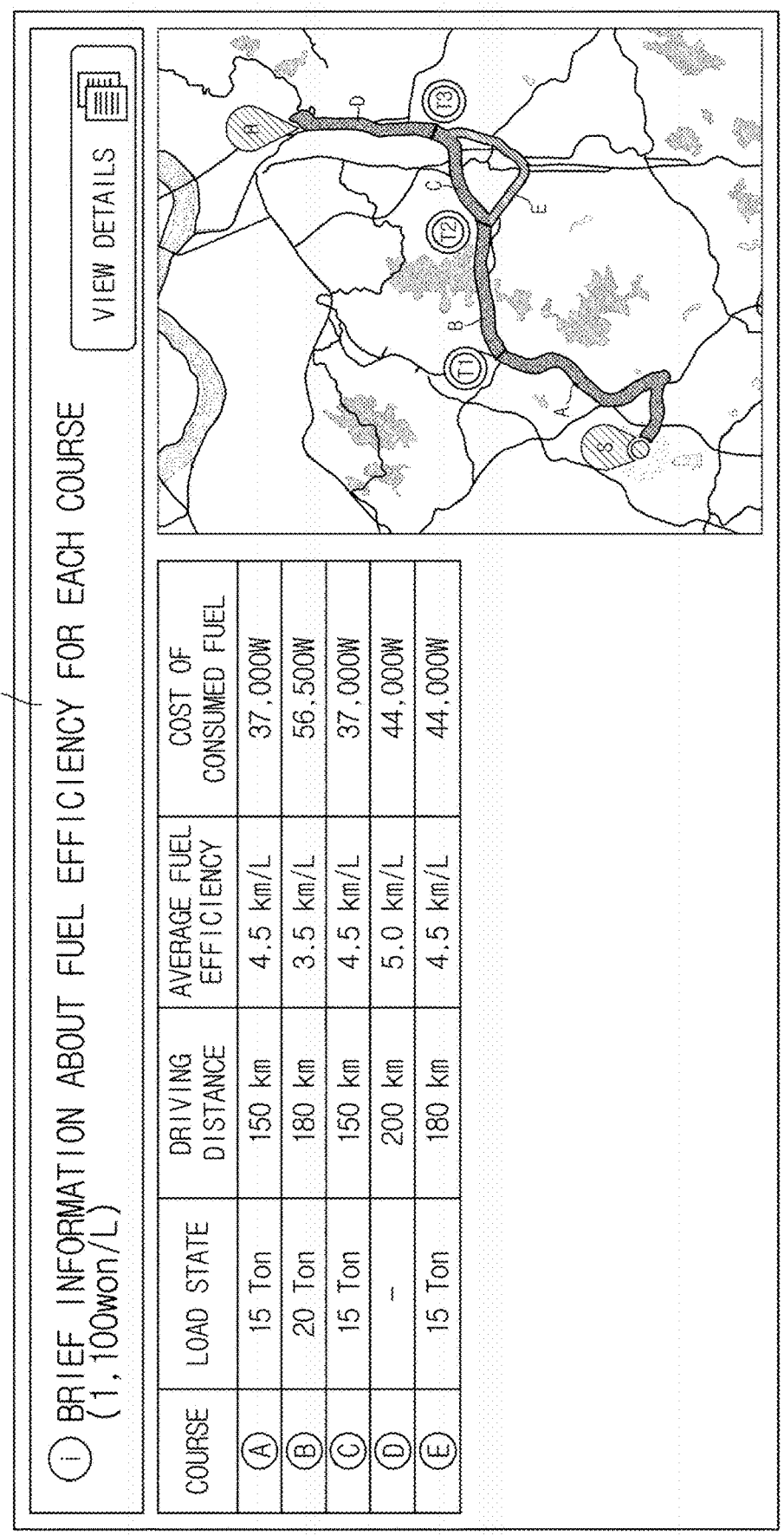
Figure 11:
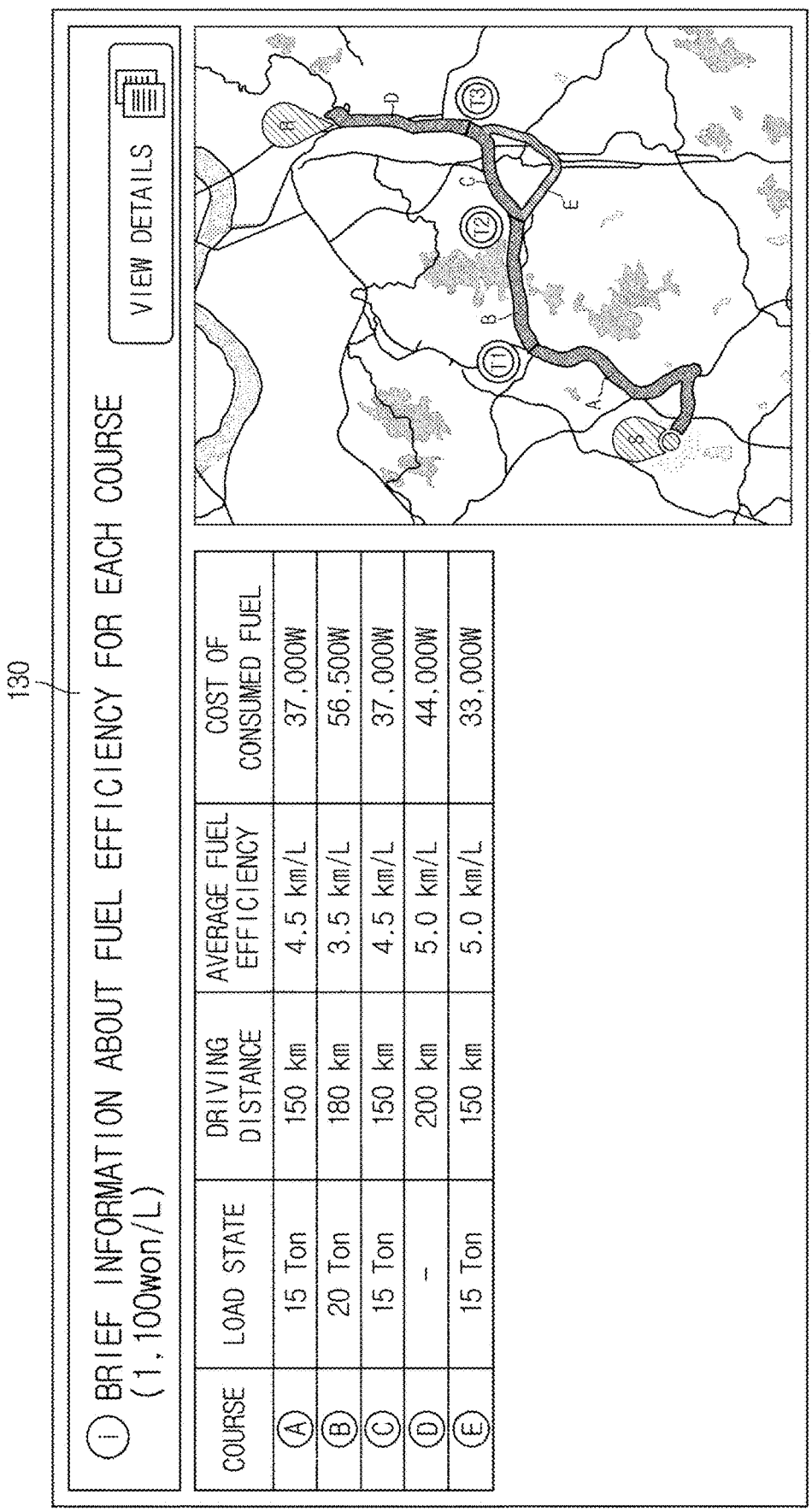

As shown in FIGS. 10 and 11, the vehicle may determine whether any one of the plurality of paths is identical to one of paths stored in the storage device 171. If the vehicle determines that one of the plurality of paths is identical to one of the paths stored in the storage device 171, the vehicle may acquire fuel efficiency information for each course of the identical path stored in the storage device 171, and display the fuel efficiency information for each course of the identical path.

The user may select a path from the point of departure to the destination based on the fuel efficiency information for each course of the path displayed on the terminal 130 of the vehicle.

For example, if there are two paths along which the vehicle can move from a stop T2 to a stop T3, the user may select a course C or a course E based on a driving distance, fuel efficiency, and cost of consumed fuel from the stop T2 to the stop T3, and drive the vehicle from the stop T2 to the stop T3 along the selected course.

As shown in FIG. 10, if a driving distance of the course C is different from a driving distance of the course E and fuel efficiency of the course C is equal to fuel efficiency of the course E, the user may select the course C having a shorter driving distance and drive the vehicle along the course C, thereby reducing cost of fuel consumption.

As shown in FIG. 11, if a driving distance of the course C is different from a driving distance of the course E and fuel efficiency of the course C is different from fuel efficiency of the course E, the user may select the course E having higher fuel efficiency and drive the vehicle along the course E, thereby reducing cost of fuel consumption.

At least one component may be added or omitted in correspondence to the performance of components of the vehicle shown in FIG. 5. Also, it will be understood by one of ordinary skill in the related art that the positions of the components can change in correspondence to the performance or structure of system.

Meanwhile, each of the components shown in FIG. 5 may be a software element or a hardware element, such as a Field Programmable Gate Array (FPGA) or an Application Specific Integrated Circuit (ASIC).

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Meanwhile, embodiments as described above may be embodied in the form of recording medium to store commands that can be executed by a computer. The commands may be stored in the form of program codes, and can create a program module, when executed by the processor, to perform the operations of the above-described embodiments. The recording medium may be embodied as computer-readable recording medium.

The computer-readable recording medium includes any kind of recording device to store commands that can be interpreted by a computer. For example, the computer-readable recording medium may be ROM, RAM, a magnetic tape, a magnetic disk, flash memory, or an optical data storage device.

According to embodiments of the present disclosure, since fuel efficiency information for each course changing according to information about whether a vehicle stops and information about weight of loaded goods is provided to a driver, detailed information about fuel efficiency can be provided to the driver. As a result, the driver can more easily manage fuel efficiency of the vehicle.

According to embodiments of the present disclosure, by providing information of a path to a destination and fuel efficiency information for each course of each path, a driver can select a path for reducing fuel efficiency. Accordingly, since the driver can select a path for reducing fuel efficiency, it is possible to reduce cost of fuel and to reduce fuel usage, thereby reducing environmental pollution.

According to embodiments of the present disclosure, by informing a driver of information about a change in fuel efficiency according to the driver's driving habits, the driver can improve his/her driving habits. Accordingly, according to the embodiments of the present disclosure, it is possible to reduce fuel efficiency of the vehicle, and to improve safety.

Therefore, according the embodiments of the present disclosure, it is possible to improve the quality and marketability of the vehicle capable of providing fuel efficiency information, to improve user satisfaction, and to ensure product competitiveness.

Although embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   a stop state detector configured to detect a stop state;
   a weight detector configured to detect weight of goods;
   a controller configured to:
      determine, if the vehicle changes to the stop state, whether weight at a trip starting location is different from weight at a current location,
      if it is determined that the weight at the trip starting location is different from the weight at the current location, acquire distance information between the trip starting location and the current location, and
      acquire fuel efficiency information corresponding to the weight at the trip starting location based on the acquired distance information; and
   a display configured to display the fuel efficiency information.

2. The vehicle according to claim 1, wherein the stop state detector includes a speed detector configured to detect driving speed, and
   if the driving speed is zero, the controller determines that the vehicle is in the stop state.

3. The vehicle according to claim 1, wherein the weight detector further detects weight of a passenger.

4. The vehicle according to claim 1, further comprising:
   an input device configured to receive information of a destination; and
   a storage device configured to store at least one path, and fuel efficiency information for each course of the at least one path,
   wherein if the information of the destination is received, the controller searches a path from a position of departure to the destination, and if the found path is identical to the at least one path stored in the storage device, the controller controls the display to display fuel efficiency information for each course of the found path.

5. The vehicle according to claim 1, wherein the display includes at least one of a cluster and a terminal for vehicle.

6. The vehicle according to claim 5, wherein the controller acquires a driving distance for a time period between time at which the vehicle starts and time at which the vehicle stops, based on navigation information received from the terminal for vehicle.

7. The vehicle according to claim 1, further comprising an odometer configured to record a driving distance while the vehicle travels,
   wherein the controller receives a total driving distance from the odometer at time at which the vehicle starts, receives a total driving distance from the odometer at time at which the vehicle stops, and subtracts the total driving distance received at the time at which the vehicle starts from the total driving distance received at the time at which the vehicle stops to acquire a driving distance for a time period between the time at which the vehicle starts and the time at which the vehicle stops.

8. The vehicle according to claim 1, further comprising:
   a first pressing detector configured to detect pressure applied to an accelerator pedal; and
   a second pressing detector configured to detect pressure applied to a brake pedal,
   wherein the controller acquires acceleration information based on the pressure detected by the first pressing detector, acquires braking information based on the pressure detected by the second pressing detector, acquires information for improving a user's driving habits for reducing fuel efficiency, based on the acquired acceleration information and the acquired braking information, and controls the display to display the information for improving the user's driving habits.

9. The vehicle according to claim 1, further comprising a communication device configured to receive refueling information from an external server,
   wherein the controller acquires cost of consumed fuel based on the received refueling information, and controls the display to display the cost of consumed fuel.

10. A terminal comprising:
   a communication interface configured to receive weight information of goods, and to receive location information periodically;

a processor configured to:
acquire driving speed of a vehicle based on the location information, to determine a stop state of the vehicle based on the driving speed, to
determine whether weight at a trip starting location is different from weight at a current location, if the vehicle changes from a driving state to the stop state,
if it is determined that the weight at the trip starting location is different from the weight at the current location, acquire distance information between the trip starting location and the current location based on the location information received by the communication interface, and
acquire fuel efficiency information corresponding to the weight at the trip starting location for a course between the trip starting location and the current location based on the distance information; and
a display configured to display the fuel efficiency information.

11. The terminal according to claim 10, further comprising an input device configured to receive a navigation mode and information of the destination,
wherein if the navigation mode and the information of the destination are received, the processor searches a path from a position of departure to the destination, and if the found path is identical to at least one pre-stored path, the processor controls the display to display fuel efficiency information for each course of the found path.

12. The terminal according to claim 10, wherein the communication interface receives braking information and acceleration information from the vehicle, and
wherein the processor acquires information for improving a user's driving habits for reducing fuel efficiency, based on the acceleration information and the braking information, and controls the display to display the information for improving the user's driving habits.

13. The terminal according to claim 10, wherein the communication interface receives refueling information from an external server, and
wherein the processor acquires cost of consumed fuel for the course based on the refueling information, and controls the display to display the cost of consumed fuel.

14. A method of controlling a vehicle, comprising:
determining whether the vehicle stops;
if it is determined that the vehicle stops, determining whether weight of goods loaded in the vehicle has changed;
if it is determined that the weight of goods has changed, setting a path between a trip starting location and a current location to a course;
acquiring fuel efficiency information corresponding to the weight at the trip starting location for the course based on distance information between the trip starting location and the current location; and
displaying the fuel efficiency information.

15. The method according to claim 14, wherein the determining of whether the vehicle stops comprises:
detecting driving speed of the vehicle; and
if the driving speed of the vehicle is zero, determining that the vehicle stops.

16. The method according to claim 15, further comprising:
identifying the current location of the vehicle when the driving speed becomes zero while the vehicle travels.

17. The method according to claim 16, further comprising:
acquiring a total driving distance from an odometer at the trip starting location;
acquiring a total driving distance from the odometer when the vehicle stops; and
acquiring the distance information based on two total driving distance.

18. The method according to claim 14, further comprising:
identifying the trip starting location if a navigation mode is selected and information of a destination is received;
searching a path from the trip starting location to the destination; and
controlling a display to display fuel efficiency information for each course of the found path, if the found path is identical to at least one pre-stored path.

19. The method according to claim 14, further comprising:
acquiring acceleration information based on pressure detected by a first pressing detector;
acquiring braking information based on pressure detected by a second pressing detector;
acquiring information for improving a user's driving habits for reducing fuel efficiency, based on the acceleration information and the braking information; and
displaying the information for improving the user's driving habits.

20. The method according to claim 14, further comprising:
receiving refueling information from an external server; and
acquiring cost of consumed fuel based on the refueling information, and displaying the cost of consumed fuel.

* * * * *